(12) United States Patent
Heo et al.

(10) Patent No.: US 11,907,607 B2
(45) Date of Patent: Feb. 20, 2024

(54) ELECTRONIC APPARATUS AND METHOD FOR OUTPUTTING IMAGE THEREOF

(71) Applicant: SAMSUNG ELECTRONICS CO., LTD., Suwon-si (KR)

(72) Inventors: Changryong Heo, Suwon-si (KR); Jongjin Kim, Suwon-si (KR); Jeongmin Park, Suwon-si (KR); Jonghwan Shin, Suwon-si (KR); Sukjae Lee, Suwon-si (KR); Junhee Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 17/514,276

(22) Filed: Oct. 29, 2021

(65) Prior Publication Data

US 2022/0050652 A1 Feb. 17, 2022

Related U.S. Application Data

(63) Continuation of application No. PCT/KR2020/004492, filed on Apr. 2, 2020.

(30) Foreign Application Priority Data

Apr. 29, 2019 (KR) ........................ 10-2019-0049985

(51) Int. Cl.
 *G06F 3/147* (2006.01)
 *G06F 1/16* (2006.01)
 (Continued)

(52) U.S. Cl.
 CPC ............ *G06F 3/147* (2013.01); *G06F 1/1616* (2013.01); *G06F 1/1652* (2013.01);
 (Continued)

(58) Field of Classification Search
 CPC .... G06F 1/1652; G06F 1/1616; G06F 1/1618; G06F 3/04815; G06F 3/147;
 (Continued)

(56) References Cited

U.S. PATENT DOCUMENTS 8,760,367 B2 6/2014 Yoshino
9,105,132 B2 8/2015 Thorn
(Continued)

FOREIGN PATENT DOCUMENTS

JP 2010-237619 A 10/2010
JP 2017-142340 A 8/2017
(Continued)

OTHER PUBLICATIONS

International Search Report dated Jul. 23, 2020, issued by the International Searching Authority in counterpart International Application No. PCT/KR2020/004492 (PCT/ISA/210).

*Primary Examiner* — Dismery Mercedes
(74) *Attorney, Agent, or Firm* — Sughrue Mion, PLLC

(57) ABSTRACT

An electronic device and a method of controlling the same are provided. The electronic device includes a housing foldable about a first axis; a foldable display foldable about a second axis parallel to the first axis; a folding sensor circuit configured to detect a display state of at least one of the housing or the foldable display; a memory storing instructions; and a processor configured to execute the instructions stored in the memory to: determine a position of a virtual light source with respect to the foldable display based on context information associated with the electronic device; render an image based on the display state detected by the folding sensor circuit and the position of the virtual light source; and control the foldable display to display the rendered image.

17 Claims, 19 Drawing Sheets

(51) Int. Cl.
*G09G 3/00* (2006.01)
*G06T 15/50* (2011.01)
*G06T 15/60* (2006.01)
*G09G 3/34* (2006.01)
*G09G 3/20* (2006.01)
*G06F 3/04815* (2022.01)

(52) U.S. Cl.
CPC .......... *G06F 3/04815* (2013.01); *G06T 15/50* (2013.01); *G06T 15/506* (2013.01); *G06T 15/60* (2013.01); *G09G 3/035* (2020.08); *G09G 3/20* (2013.01); *G09G 3/3406* (2013.01); *G06F 2200/1614* (2013.01); *G09G 2320/0233* (2013.01); *G09G 2320/0261* (2013.01); *G09G 2340/0492* (2013.01); *G09G 2360/144* (2013.01)

(58) Field of Classification Search
CPC ...... G06F 3/0346; G06F 1/1626; G06F 3/011; G09G 3/003; G09G 3/035; G09G 3/3406; G09G 2320/0261; G09G 2320/02; G09G 2340/0492; G09G 2380/02; G06T 15/50; G06T 2215/16; G06T 15/60; G06T 7/586; G06T 7/70; G06T 19/006; G06T 15/10; G06T 15/80

See application file for complete search history.

(56) References Cited

U.S. PATENT DOCUMENTS

| | | | |
|---|---|---|---|
| 9,466,149 B2 | 10/2016 | Jones et al. | |
| 9,547,412 B1* | 1/2017 | Dillon | G06F 3/011 |
| 9,881,414 B2 | 1/2018 | Lee et al. | |
| 9,983,628 B2 | 5/2018 | Kim et al. | |
| 10,152,088 B2 | 12/2018 | Ka et al. | |
| 10,181,210 B2 | 1/2019 | Lee et al. | |
| 10,264,183 B2 | 4/2019 | Eom | |
| 10,564,675 B2 | 2/2020 | Ka et al. | |
| 2004/0135739 A1* | 7/2004 | Fukushima | G09G 3/003 348/E13.067 |
| 2010/0245369 A1 | 9/2010 | Yoshino | |
| 2012/0036433 A1* | 2/2012 | Zimmer | G06T 15/20 715/702 |
| 2012/0105589 A1 | 5/2012 | Thorn | |
| 2012/0135783 A1* | 5/2012 | Sams | H04M 1/72454 348/222.1 |
| 2014/0055375 A1 | 2/2014 | Kim et al. | |
| 2014/0375219 A1* | 12/2014 | Lee | G09G 3/20 315/153 |
| 2015/0077591 A1* | 3/2015 | Fujiwara | H04N 23/62 348/234 |
| 2015/0187128 A1* | 7/2015 | Jones | G06T 15/506 345/426 |
| 2016/0048988 A1* | 2/2016 | Lee | G06T 11/60 345/629 |
| 2016/0187994 A1* | 6/2016 | La | G06F 3/147 345/619 |
| 2016/0225183 A1 | 8/2016 | Lee et al. | |
| 2016/0261803 A1 | 9/2016 | Eom | |
| 2017/0075640 A1* | 3/2017 | Chun | G06F 3/0481 |
| 2017/0263047 A1* | 9/2017 | Mima | G06T 15/60 |
| 2019/0164335 A1* | 5/2019 | Sheffield | G06T 17/00 |
| 2020/0225706 A1* | 7/2020 | Jung | H04M 1/72427 |

FOREIGN PATENT DOCUMENTS

| | | |
|---|---|---|
| KR | 10-2014-0025933 A | 3/2014 |
| KR | 10-2015-0125554 A | 11/2015 |
| KR | 10-2016-0021607 A | 2/2016 |
| KR | 10-2016-0106985 A | 9/2016 |
| KR | 10-2017-0079547 A | 7/2017 |
| KR | 10-2018-0050631 A | 5/2018 |

* cited by examiner

ELECTRONIC APPARATUS AND METHOD FOR OUTPUTTING IMAGE THEREOF

CROSS-REFERENCE TO RELATED APPLICATION(S)

This application is a by-pass continuation application of International Application No. PCT/KR2020/004492 filed Apr. 2, 2020, which is based on and claims priority to Korean Patent Application No. 10-2019-0049985 filed Apr. 29, 2019 in the Korean Intellectual Property Office, the disclosures of which are incorporated by reference herein in their entirety.

BACKGROUND

1. Field

Embodiments of the disclosure relate to a display technology of an electronic device.

2. Description of Related Art

Electronic devices provide various pieces of content such as e-mails, web documents, or a note function. Mobiles devices have come into wide use and have become miniaturized. Contrary to the miniaturization of the electronic devices, there has been an increase in demand for a larger screen of the mobile device, and accordingly, the sizes of the electronic devices have also increased. When an electronic device increases in size, a user may enjoy content such as a game or a video by means of a large screen. Furthermore, the user may easily control the electronic device by means of a large-sized user interface. Contrary to such advantages, when the electronic device increases in size, the portability of the mobile device is reduced.

To address such a problem, an electronic device including a foldable display has been developed. A foldable device may be implemented using a housing having a hinge structure and a flexible display coupled to the housing. The electronic device having the foldable display may be classified as an in-folding scheme or an out-folding scheme depending on a direction where the foldable display is folded with respect to a folding axis which is an axis at which the electronic device is folded.

An electronic device having a display may output an image for providing a user with a lock screen, a home screen, and the like through the display. As an image is output through a foldable display having a shape different from an existing display, there is a need for a new image output scheme capable of enhancing user experience using the foldable display. Embodiments of the disclosure provide an electronic device and a method for displaying an image on a foldable display.

SUMMARY

Additional aspects will be set forth in part in the description which follows, and in part, will be apparent from the description, or may be learned by practice of the presented embodiments.

In accordance with an aspect of the disclosure, there is provided an electronic device including: a housing foldable about a first axis; a foldable display foldable about a second axis parallel to the first axis; a folding sensor circuit configured to detect a display state of at least one of the housing or the foldable display; a memory storing instructions; and a processor configured to execute the instructions stored in the memory to: determine a position of a virtual light source with respect to the foldable display based on context information associated with the electronic device; render an image based on the display state detected by the folding sensor circuit and the position of the virtual light source; and control the foldable display to display the rendered image.

The electronic device further includes: an orientation sensing circuit configured to detect an orientation of the electronic device, wherein the context information comprises the orientation of the electronic device, and wherein the processor is further configured to: determine the position of the virtual light source based on the orientation of the electronic device.

The context information further includes time information indicating a time of the position of the virtual light source with respect to the orientation of the electronic device.

The electronic device further includes: a plurality of illumination sensors configured to sense illumination around the electronic device, wherein the processor is further configured to: determine the position of the virtual light source based on a value detected by an illumination sensor among the plurality of illumination sensors meeting a specified condition.

The processor is further configured to: determine positions of a plurality of virtual light sources based on values detected by the plurality of illumination sensors meeting the specified condition; determine a plurality of image effects respectively corresponding to the plurality of virtual light sources; and render the image by applying the plurality of image effects.

The processor is further configured to: render the image such that a number of visual objects included in the image or luminance output in at least a portion of the image is changed according to a change in the display state.

The housing includes a first housing structure and a second housing structure foldable with respect to the first housing structure about the first axis, wherein the foldable display includes a first portion coupled to the first housing structure and a second portion coupled to the second housing structure, and the first portion is foldable with respect to the second portion about the second axis, and wherein the processor is further configured to: determine a shadow region on which a shadowing effect is to be applied in the second portion based on the display state and the position of the virtual light source; and render the image such that the shadowing effect is displayed on the determined shadow region.

The electronic device further includes: an orientation sensing circuit configured to detect an orientation of the electronic device, wherein the processor is further configured to: determine a shadowing application mode associated with the shadowing effect based on the orientation of the electronic device; render the image such that the shadowing effect is applied to the first portion and the shadow region when the shadowing application mode is a landscape mode; and render the image such that the shadowing effect is displayed on a region adjacent to the second axis in the first portion and a region adjacent to the second axis in the second portion, when the shadowing application mode is a portrait mode.

The image includes a visual object and a shadow object corresponding to the visual object, and wherein the processor is further configured to: render the image such that the shadow object is displayed in a length determined according to the display state.

The processor is further configured to: divide a basic image to be displayed on the foldable display into a background region and a region of interest; apply a first image effect to the background region based on the display state; and apply a second image effect to the region of interest based on at least one of the display state or the position of the virtual light source.

The first image effect includes changing luminance of the background region based on the display state.

The second image effect includes displaying a shadow object on the region of interest or a periphery of the region of interest depending on at least one of the display state or the position of the virtual light source.

In accordance with an aspect of the disclosure, there is provided a method for outputting an image in an electronic device. The method includes: obtaining context information associated with the electronic device; determining a position of a virtual light source with respect to a foldable display based on the context information; detecting a display state of at least one of a housing of the electronic device or the fordable display; rendering an image based on the detected display state and the position of the virtual light source; and controlling the foldable display to display the rendered image.

The obtaining the context information includes: obtaining an orientation of the electronic device, and wherein the determining the position of the virtual light source includes: determining the position of the virtual light source based on the orientation of the electronic device.

The obtaining the context information includes: obtaining at least one illumination value around the electronic device; and determining the position of the virtual light source based on the at least one illumination value meeting a specified condition.

The rendering the image includes: rendering the image such that a number of visual objects included in the image or luminance output in at least a portion of the image is changed according to a change in the display state.

The obtaining the context information includes: obtaining an orientation of the electronic device, and the method further includes: determining a shadowing application mode associated with a shadowing effect based on the orientation of the electronic device, wherein the rendering the image further includes: determining a shadow region where the shadowing effect is to be applied based on the display state and the position of the virtual light source; and rendering the image such that the shadowing effect is displayed on the determined shadow region.

The image includes a visual object and a shadow object corresponding to the visual object, and wherein the rendering the image further includes: rendering the image such that the shadow object is displayed in a length determined according to the display state.

The method further includes: obtaining a basic image; and dividing the basic image into a background region and a region of interest, wherein the rendering the image further includes: applying a first image effect to the background region based on the display state; and applying a second image effect to the region of interest based on the display state or the position of the virtual light source.

The first image effect includes changing luminance of the background region based on the display state, and the second image effect includes displaying a shadow object on the region of interest or a periphery of the region of interest depending on at least one of the display state or the position of the virtual light source.

DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
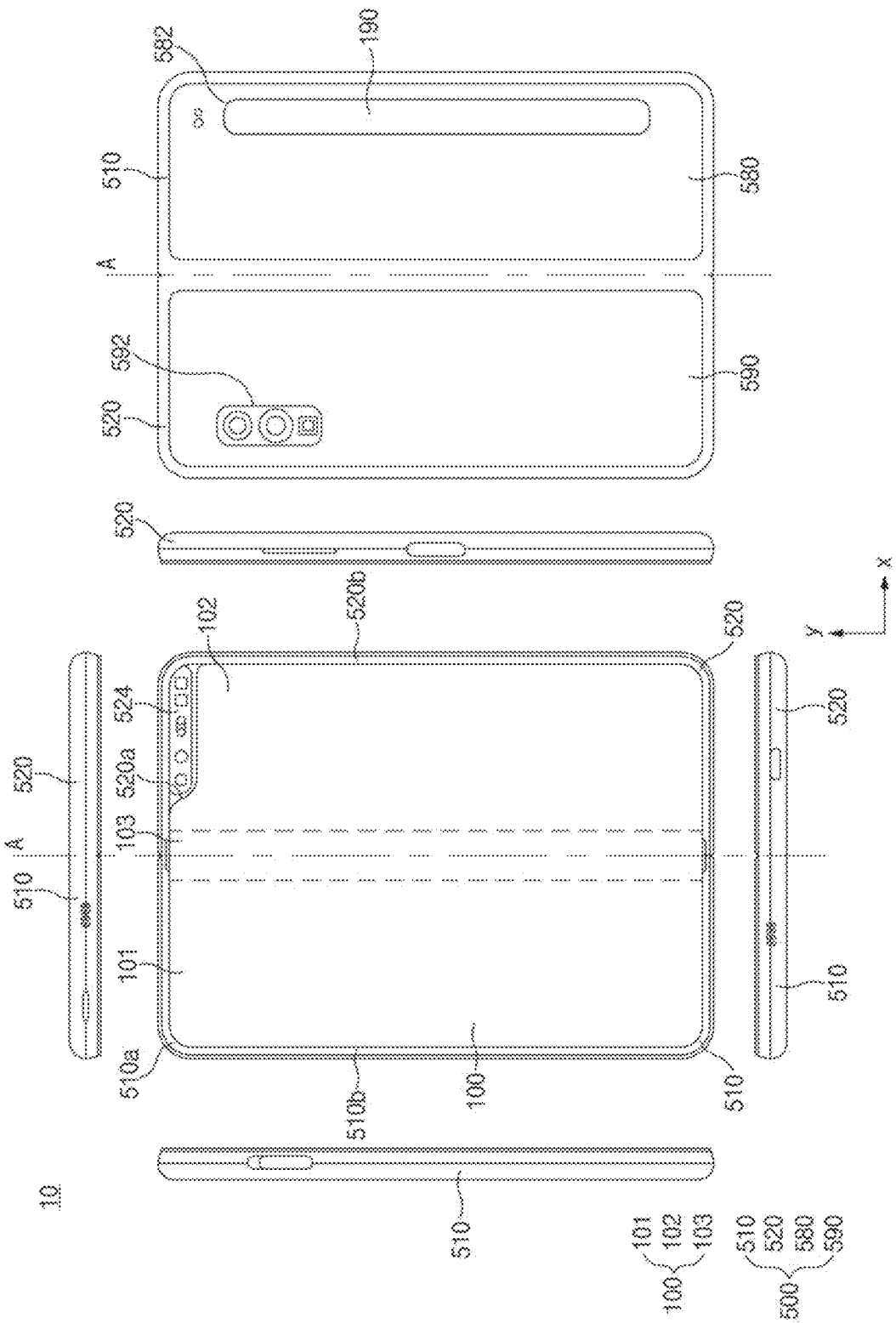
FIG. 1 illustrates an electronic device of an unfolded mode, according to an embodiment.
Figure 2:
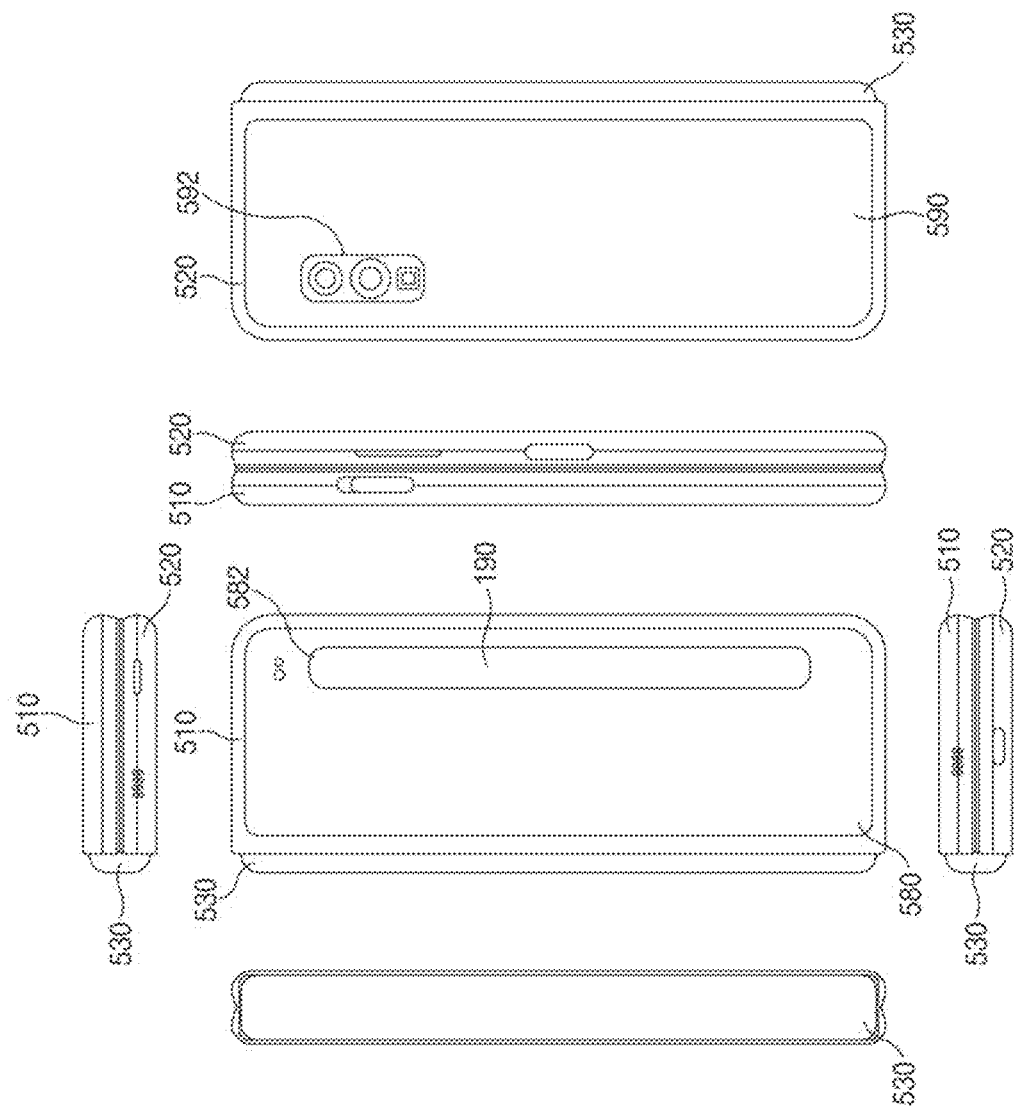
FIG. 2 illustrates an electronic device of a folded mode, according to an embodiment.
Figure 3:
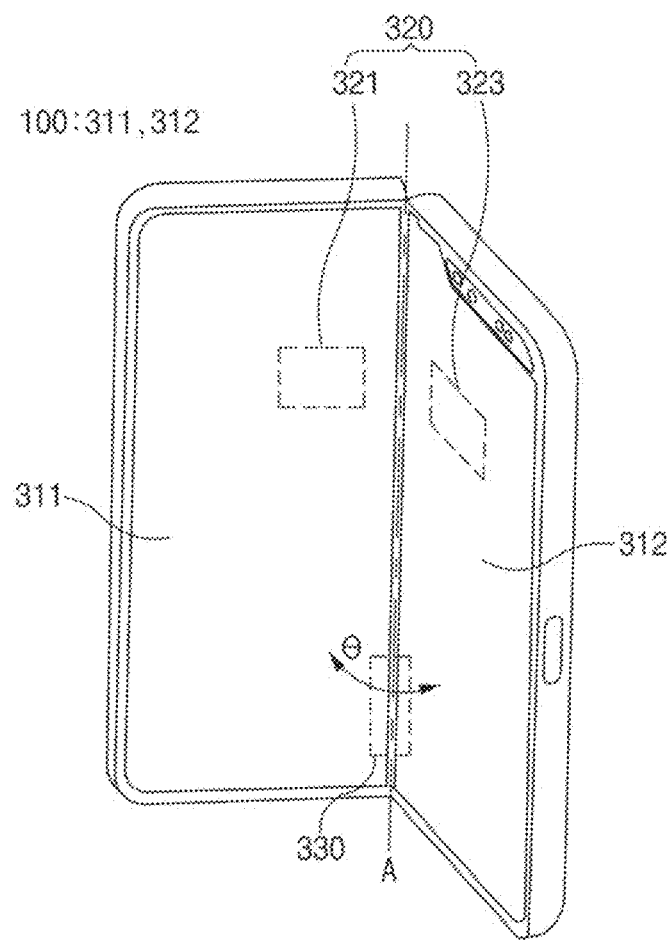
FIG. 3 illustrates an electronic device of a table mode, according to an embodiment.

FIG. 1 illustrates an electronic device 10 of an unfolded mode, according to an embodiment. FIG. 2 illustrates an electronic device of a folded mode, according to an embodiment. A display state associated with folding of the electronic device may have at least one of an unfolded state (or flat state) as shown in FIG. 1, a folded state as shown in FIG. 2, and an intermediate state between the unfolded state and the folded state as shown in FIG. 3. In the disclosure, the unfolded state as shown in FIG. 1 may also be referred to as an unfolded mode of the electronic device. Similarly, the folded state as shown in FIG. 2 may also be referred to as a folded mode of the electronic device. Furthermore, the intermediate state between the unfolded state and the folded state as shown in FIG. 3 may also be referred to as a table mode. For example, the table mode may be a state where a folded angle of a housing is an angle between about 120 degrees and about 140 degrees, which may be a display state suitable for a user to put and use the electronic device 10 on the table.

Referring to FIGS. 1 and 2, the electronic device 10 may include a foldable housing 500, a hinge cover 530 covering a foldable portion of the foldable housing 500, and a flexible or foldable display 100 (hereinafter, "display 100") disposed in a space formed by the foldable housing 500. In the disclosure, a surface on which the display 100 is disposed is defined as a first surface or a front surface of the electronic device 10. A surface opposite to the front surface is defined as a second surface or a back surface of the electronic device 10. Furthermore, a surface surrounding a space between the first surface and the back surface is defined as a third surface or a side surface of the electronic device 10.

In an embodiment, the foldable housing 500 may include a first housing structure 510, a second housing structure 520 including a sensor region 524, a first back cover 580, and a second back cover 590. The foldable housing 500 of the electronic device 10 may not be limited to the shape and connection illustrated in FIGS. 1 and 2, and may be implemented in another shape or by a combination and/or connection of other components. For example, in another embodiment, the first housing structure 510 and the first back cover 580 may be integrally formed with each other, and the second housing structure 520 and the second back cover 590 may be integrally formed with each other.

In the embodiment illustrated, the first housing structure 510 and the second housing structure 520 may be disposed on both sides about a folding axis (axis A), and may be disposed symmetrically about the folding axis A. As will be described later, the first housing structure 510 and the second housing structure 520 may vary in an angle formed by them or a distance therebetween depending on whether the display state of the electronic device 10 is a flat state, a folded state, or an intermediate state. In the disclosure, a state associated with a folded degree of at least one of a housing or a display of the electronic device 10 may be referred to as a display state of the electronic device 10. In the embodiment, unlike the first housing structure 510, the second housing structure 520 may additionally include a sensor region 524 in which various sensors are arranged, but may have a mutually symmetrical shape in the remaining region.

In an embodiment, at least a portion of the first housing structure 510 and the second housing structure 520 may be formed of a metal material or a nonmetal material having rigidity of a magnitude capable of supporting the display 100.

In an embodiment, the sensor region 524 may be formed at one corner of the second housing structure 520. However, the disposition, shape, and size of the sensor region 524 are not limited to the one or more embodiments. For example, in another embodiment, the sensor region 524 may be provided at another corner of the second housing structure 520 or in any region between an upper corner and a lower corner. In an embodiment, components for performing various functions, which are embedded in the electronic device 10, may be exposed on the front surface of the electronic device 10 through the sensor region 524 or through one or more openings provided in the sensor region 524. In various embodiments, the components may include various types of sensors. The sensor may include, for example, a front camera, a receiver, a proximity sensor, and etc.

The first back cover 580 may be disposed at one side of the folding axis on the back surface of the electronic device and may have, for example, a substantially rectangular periphery, and the periphery may be surrounded by the first housing structure 510. Similarly, the second back cover 590 may be disposed at another side of the folding axis on the back surface of the electronic device, and a periphery thereof may be surrounded by the second housing structure 520.

In the embodiment illustrated, the first back cover 580 and the second back cover 590 may have a substantially symmetrical shape about the folding axis (axis A). However, the first back cover 580 and the second back cover 590 may not necessarily have the mutually symmetrical shape. In another embodiment, the electronic device 10 may include the first back cover 580 and the second back cover 590 of various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space where various components (e.g., a printed circuit board or a battery) of the electronic device 10 can be arranged. In an embodiment, one or more components may be disposed on the back surface of the electronic device 10 and may be visually exposed. For example, at least a portion of a sub display 190 may be visually exposed through a first back region 582 of the first back cover 580. In another embodiment, one or more components or sensors may be visually exposed through a second back region 592 of the second back cover 590. In various embodiments, the sensor may include a proximity sensor and/or a rear camera.

Referring to FIG. 2, the hinge cover 530 may be disposed between the first housing structure 510 and the second housing structure 520 to cover an inner component (e.g., a hinge structure). In an embodiment, depending on a state (an unfolded state or a folded state) of the electronic device 10, the hinge cover 530 may be covered by a portion of the first housing structure 510 and the second housing structure 520 or may be exposed to the outside.

For example, as shown in FIG. 1, when the display state of the electronic device 10 is the unfolded state (e.g., the unfolded mode), the hinge cover 530 may be covered by the first housing structure 510 and the second housing structure 520 and not exposed to the outside. For example, as shown in FIG. 2, when the display state of the electronic device 10 is the folded state (e.g., a fully folded state or the folded mode), the hinge cover 530 may be exposed to the outside between the first housing structure 510 and the second housing structure 520. For example, the first housing structure 510 and the second housing structure 520 are in an intermediate state (e.g., the table mode) folded with a certain angle, the hinge cover 530 may be partially exposed to the outside between the first housing structure 510 and the second housing structure 520. However, in this case, the exposed region may be smaller than that in the fully folded state. In an embodiment, the hinge cover 530 may include a curved surface.

The display 100 may be disposed on a space formed by the foldable housing 500. For example, the display 100 may be disposed on a recess formed by the foldable housing 500 and may cover the most of the front surface of the electronic device 10.

Accordingly, the front surface of the electronic device 10 may include the display 100, a partial region of the first housing structure 510 adjacent to the display 100, and a partial region of the second housing structure 520 adjacent to the display 100. The back surface of the electronic device 10 may include the first back cover 580, a partial region of the first housing structure 510 adjacent to the first back cover 580, the second back cover 590, and a partial region of the second back cover 590 adjacent to the second back cover 590.

The display 100 may include at least a portion of which is able to be deformed to a flat surface or a curved surface. In an embodiment, the display 100 may include a folding region 103, a first region 101 disposed on one side (a left side of the folding region 103 illustrated in FIG. 1) with respect to the folding region 103, and a second region 102 disposed on the other side (a right side of the folding region 103 illustrated in FIG. 1).

The region division of the display 100, which is shown in FIG. 1, is illustrative, and the display 100 may be divided into a plurality of (e.g., four or more or two) regions depending on a structure or function thereof. For example, in the embodiment illustrated in FIG. 1, the region of the display 100 may be divided by the folding region 103 extended in parallel to a y-axis or the folding axis (axis A), but, in another embodiment, the region of the display 100 may be divided with respect to another folding region (a folding region parallel to an x-axis) or another folding axis (e.g., a folding axis parallel to the x-axis).

The first region 101 and the second region 102 may have the overall symmetrical shape with respect to the folding region 103. However, unlike the first region 101, the second region 102 may include a notch formed according to the presence or configuration of the sensor region 524, but may be symmetrical to the first region 101 in shape in the remaining region. In other words, the first region 101 and the second region 102 may include a portion having a symmetrical shape and a portion having an asymmetrical shape.

Hereinafter, a description will be given of an operation of the first housing structure 510 and the second housing structure 520 and each region of the display 100, depending on the display state (e.g., the unfolded mode, the folded mode, or the table mode) of the electronic device 10.

In an embodiment, when the display state of the electronic device 10 is the flat state (e.g., FIG. 1), the first housing structure 510 and the second housing structure 520 may form an angle of 180 degrees and may be arranged to face the same direction. That is, a surface of the first region 101 of the display 100 and a surface of the second region 102 of the display 100 may form an angle of 180 degrees and may face the same direction (e.g., a front direction of the electronic device). The folding region 103 may form the same plane as the first region 101 and the second region 102.

In an embodiment, when the display state of the electronic device 10 is the folded state (e.g., FIG. 2), the first housing structure 510 and the second housing structure 520 may be arranged to face each other. The surface of the first region 101 of the display 100 and the surface of the second region 102 of the display 100 may form a narrow angle (e.g., between from 0 degree to 10 degrees) with each other and may face each other. At least a portion of the folding region 103 may be formed with a curved surface having a certain curvature.

In an embodiment, when the display state of the electronic device 10 is the intermediate state (e.g., FIG. 3), the first housing structure 510 and the second housing structure 520 may be arranged at a certain angle. The surface of the first region 101 of the display 100 and the surface of the second region 102 of the display 100 may form an angle greater than that in the folded state and smaller than that in the flat state. At least a portion of the folding region 103 may be formed with a curved surface having a certain curvature. At this time, the curvature may be smaller than that in the folded state.

FIG. 3 illustrates an electronic device of a table mode according to an embodiment.

Referring to FIGS. 2 and 3, an electronic device 10 (e.g., an electronic device 10 of FIG. 1) may be in an intermediate state between a folded state and a flat state. For example, a hinge structure included in a hinge cover 530 may fix a first housing structure 510 and a second housing structure 520 in the intermediate state between the folded state and the flat state. As another example, the hinge structure may fix the first housing structure 510 and the second housing structure 520 such that the first housing structure 510 and the second housing structure 520 forms a specific folded angle (e.g., θ=140 degrees). In the disclosure, the angle formed by the first housing structure 510 and the second housing structure 520 or an angle formed by a first region 101 and a second region 102 may be referred to as a folded angle. In the disclosure, the state where the first housing structure 510 and the second housing structure 520 are fixed to form a specified angle is referred to as a state where the electronic device 10 is folded at the specified angle.

According to an embodiment, the electronic device 10 may include at least one sensor 320. The at least one sensor circuit 320 may include a folding sensor circuit capable of detecting information associated with a display state (e.g., a flat state, a folded state, and a state folded at a specified angle) of the electronic device 10. For example, a hall sensor 321 may be disposed in a left region 311 of the electronic device 10 with respect to folding axis A, and a magnet 323 may be disposed in a right region 321 of the electronic device 10 to face the hall sensor 321 in the state where the electronic device 10 is folded. When the hall sensor 321 does not face the magnet 323 in the state where the electronic device 10 is unfolded, the hall sensor 321 may not detect magnetic field of the magnet 323. When the electronic device 10 is folded, because the hall sensor 321 faces at least a portion of the magnet 323, the hall sensor 321 may detect magnetic field of the magnet 323. As the angle θ formed between the left region 311 and the right region 312 of the electronic device 10 decreases, the strength of the magnetic field of the magnet 323 detected by the hall sensor 321 may increase.

In addition, the folding sensor circuit may include an angle sensor 330 capable of sensing a folded angle (e.g., angle θ) according to an operation of a hinge portion of the electronic device 10. For example, the folding sensor circuit may include at least one of an accelerometer or a gyroscope included in the first housing structure 510 and at least one of an accelerometer or a gyroscope included in the second housing structure 520.

When magnetic field strength sensed using the hall sensor 321 is greater than or equal to a first predetermined strength, the electronic device 10 may determine that the display state of the electronic device 10 is in a folded state (e.g., a folded mode). When the magnetic field strength sensed using the hall sensor 321 is less than a second predetermined strength, the electronic device 10 may determine that the display state of the electronic device 10 is a flat state (e.g., an unfolded mode may be indicated by the magnetic field strength of "0"). When the magnetic field strength sensed by the hall sensor 321 is within a predetermined range, the electronic device 10 may determine that the display state of the electronic device 10 is in a table mode. The predetermined range may be determined by means of an experiment of measuring the magnetic field strength in a condition where the electronic device 10 is folded at the specified angle.

The electronic device 10 may control the operation of the display 100 according to the display state (e.g., the flat state, the folded state, or table mode) of the electronic device 10. For example, when the electronic device 10 is folded while the display 100 is turned on, the electronic device 10 may turn off the display 100. As another example, when the electronic device 10 is unfolded from the folded state, it may turn on the display 100 and may output an image through the display 100. As another example, the electronic device 10 may display an image output on the display 100 when the state where the electronic device 10 is folded at a specified angle to be different from an image output on the display 100 when the state where the electronic device 10 is unfolded. In the state where the electronic device 10 is unfolded, the electronic device 10 may determine whether the magnetic field strength sensed by the hall sensor 321 is within the predetermined range. When the magnetic field strength sensed by the hall sensor 321 is within the predetermined range, the electronic device 10 may determine that the electronic device 10 is folded at a specified angle and adjust the image output on the display 100 accordingly.

According to an embodiment, when the folded state of the electronic device 10 is the state folded at the specified angle, the electronic device 10 may be configured to support a one-handed operation mode. For example, when identifying that the electronic device 10 is held during a specified time by one hand of a user in the state where the electronic device 10 is folded at the specified angle, the electronic device 10 may switch to the one-handed operation mode to switch a page of content displayed on the display 100 based on at least one of motion of the electronic device 10 or a gaze direction of the user in the one-handed operation mode.

According to an embodiment, the information associated with the display state of the electronic device may include information indicating any one or more of the unfolded mode, the folded mode, or the table mode shown in FIGS. 1, 2, and 3. Alternatively, the information associated with the display state of the electronic device may include a value indicating a folded angle.

The electronic device 10 shown in FIGS. 1, 2, and 3 is only an example embodiment, and should not be understood as being limited to the configuration shown in FIGS. 1, 2, and 3.

Figure 4:
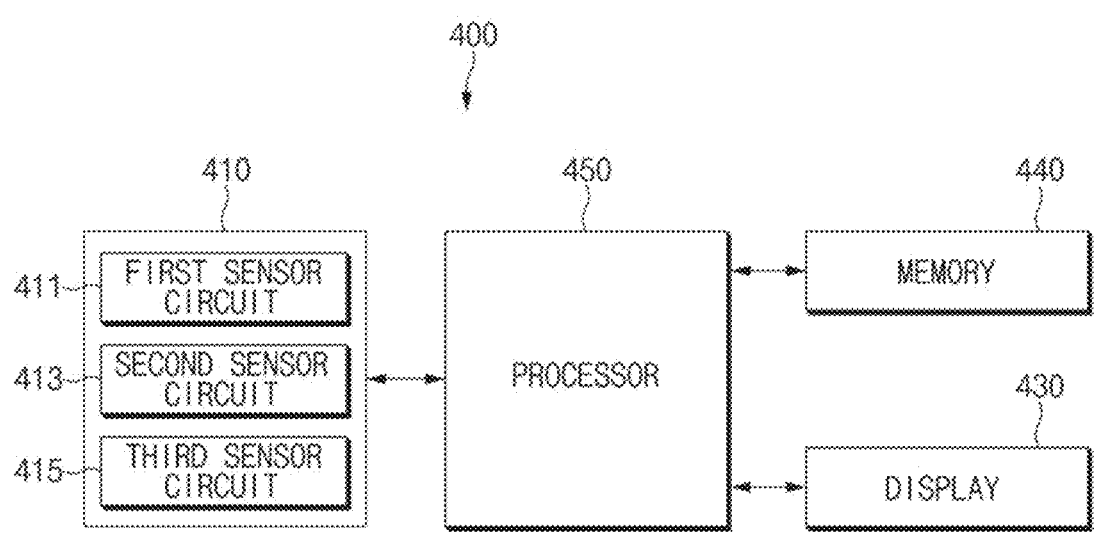
FIG. 4 is a diagram illustrating an electronic device, according to an embodiment.

FIG. 4 is a diagram illustrating an electronic device according to an embodiment.

According to an embodiment, an electronic device 400 (e.g., an electronic device 10 of FIG. 1) may include a sensor circuit 410, a display 430, a memory 440, and a processor 450. The electronic device 400 according to an embodiment may be configured to exclude some components shown in FIG. 4 or may further include an additional component. According to an embodiment, some of the components shown in FIG. 4 may be configured with one entity by being coupled to each other or may be separately configured with a plurality of entities.

According to an embodiment, the sensor circuit 410 may include at least one of a first sensor circuit 411, a second sensor circuit 413, or a third sensor circuit 415. According to an embodiment, the electronic device may obtain at least a portion of context information associated with the electronic device using the sensor circuit 410. The first sensor circuit 411 may include a folding sensor circuit capable of detecting information associated with a display state of at least one of a housing (e.g., a housing 500 of FIG. 1) or a foldable display 430 (e.g., a display 100 of FIG. 1). For example, the first sensor circuit 411 may include a hall sensor (e.g., a hall sensor 321 and a magnet 323 of FIG. 1). As another example, the folding sensor circuit may include an angle sensor (e.g., an angle sensor 33 of FIG. 3) capable of sensing an angle value according to an operation of a hinge portion of the electronic device. As another example, the folding sensor circuit may include at least one of an accelerometer or a gyroscope included in a first housing structure (e.g., a first housing structure 510 of FIG. 1) and at least one of an accelerometer or a gyroscope included in a second housing structure (e.g., a second housing structure 520 of FIG. 1)

The second sensor circuit 413 may include, for example, a plurality of illumination sensors for sensing illumination around the electronic device. According to an embodiment, the electronic device may recognize that there is a light source in a direction where an illumination sensor among a plurality of illumination sensors senses a high illumination value. The third sensor circuit 415 may include, for example, an orientation sensing circuit for detecting information about an orientation of the electronic device. According to an embodiment, the electronic device may obtain information about an orientation of the electronic device (or information about a bearing) using at least one of a motion sensor (e.g., an accelerometer or a gyroscope) or a magnetic sensor. For example, the information about the bearing may include information indicating a bearing where the electronic device is placed with respect to geomagnetism using a geomagnetic sensor. The information about the orientation may include, for example, information indicating whether the electronic device is placed laterally or longitudinally.

The display 430 may display, for example, various pieces of content including an image. The display 430 may include, for example, a liquid crystal display (LCD), a light-emitting diode (LED) display, an organic LED (OLED) display, or an electronic paper display. The display 430 may include a flexible display or a foldable display. The display 430 may include a touchscreen display coupled to a touch sensor. In the disclosure, the display 430 is described as the touchscreen display, as an example. However, the one or more embodiments of the disclosure are not limited thereto.

The memory 440 may store, for example, commands or data associated with at least one other component of the electronic device 400. The memory 440 may be a volatile memory (e.g., a random access memory (RAM) or the like), a non-volatile memory (e.g., a read-only memory (ROM), a flash memory, or the like), or a combination thereof. The memory 440 may include instructions, when executed, causing the processor to perform an operation of controlling a component of the electronic device or processing data. The operation of the electronic device disclosed in the disclosure may be performed as the processor 450 executes the instructions stored in the memory 440.

According to an embodiment, an electronic device may include a housing (e.g., a housing 500 of FIG. 1) foldable about a first axis, a foldable display (e.g., a display 100 of FIG. 1) foldable about a second axis parallel to the first axis, a folding sensor circuit (e.g., a first sensor circuit 411 of FIG. 4) capable of detecting information associated with a display state of at least one of the housing or the foldable display, a processor (e.g., a processor 450 of FIG. 4), and a memory (e.g., a memory 440 of FIG. 4).

The memory may store instructions, when executed, causing the processor to determine a position of a virtual light source with respect to the foldable display based on context information associated with the electronic device, render an image based on the information associated with the display state and the position of the virtual light source, when a change in the information associated with the display state of the at least one of the housing or the foldable display is detected by means of the foldable sensor circuit, and output the rendered image through the foldable display.

According to an embodiment, the electronic device may further include orientation sensing information for detecting information about an orientation of the electronic device. The context information may include the information about the orientation. The instructions stored in the memory, when executed, may cause the processor to determine the position of the virtual light source based on the context information.

According to an embodiment, the context information may further include information associated with a time. The instructions stored in the memory, when executed, may cause the processor to determine the position of the virtual light source based on the context information (e.g., the information associated with the time and the information about the orientation). For example, as the position of the sun moves over time, the position of the virtual light source may change.

According to an embodiment, the electronic device may include a plurality of illumination sensors for sensing illumination around the electronic device. The instruction stored in the memory, when executed, may cause the processor to determine the position of the virtual light source based on an orientation of an illumination sensor among a plurality of illumination sensors sensing illumination meeting a specified condition. The specified condition may include, for example, the highest value among illumination values sensed by the plurality of illumination sensors. As another example, the specified condition may include an illumination value having a predetermined value or more. However, the one or more embodiments of the disclosure are not limited thereto.

According to an embodiment, the instructions stored in the memory, when executed, may cause the processor to determine positions of a plurality of virtual light sources, when the illumination sensor sensing the illumination meeting the specified condition is plural in number. The processor may determine a plurality of image effects respectively corresponding to the plurality of light sources and may render an image by applying the plurality of image effects to the image.

According to an embodiment, the instructions stored in the memory, when executed, may cause the processor to render the image such that the number of visual objects included in the image or luminance outputting at least a portion of the image is changed depending on a change in the display state.

According to an embodiment, the housing of the electronic device may include a first housing structure (e.g., a first housing structure 510 of FIG. 1) and a second housing structure (e.g., a second housing structure 520 of FIG. 1) foldable with respect to the first housing structure about the first axis. The foldable display of the electronic device may include a first portion (e.g., a first region 101 of FIG. 1) coupled to the first housing structure and a second portion (e.g., a second region 102 of FIG. 1) coupled to the second housing structure. The first portion is foldable with respect to the second portion about the second axis. The instructions stored in the memory may cause the processor to determine a shadow region on which a shadowing effect will be displayed in the second portion based on the information associated with the display state and the position of the virtual light source and may render the image such that a shadowing effect is displayed on the determined shadow region.

The electronic device may include an orientation sensing circuit for detecting information about an orientation of the electronic device. The instructions stored in the memory may cause the processor to determine a shadowing application mode associated with the shadowing effect based on context information including the information about the orientation. For example, the processor may determine whether the electronic device is placed laterally or longitudinally based on a value sensed using an accelerometer or a gyroscope. The instructions stored in the memory may cause the processor to render the image such that the shadowing effect is applied to all of the first portion and the shadow region, when the shadowing application mode is a landscape mode. The instructions stored in the memory may cause the processor to render the image such that the shadowing effect is displayed on a region adjacent to the second axis in the first portion and a region adjacent to the second axis in the second portion, when the shadowing application mode is a portrait mode.

According to an embodiment, the image output through the foldable display may include a visual object and a shadow object corresponding to the visual object. The instructions stored in the memory, when executed, may cause the processor to render the image such that the shadow object is displayed in a length determined according to the information associated with the display state.

According to an embodiment, the instructions stored in the memory, when executed, may cause the processor to divide a basic image to be displayed on the foldable display into a background region and a region of interest. The processor may apply a first image effect corresponding to the information associated with the display state to the basic image, in the process of rendering the image. The processor may apply a second image effect corresponding to at least one of information associated with the region of interest, the information associated with the display state, or the position of the virtual light source to the basic image, in the process of rendering the image. The information associated with the region of interest may include, for example, information associated with a position where the region of interest is displayed in the image or a type of an object (e.g., a person, an animal, a plant, or the like) included in the region of interest.

According to an embodiment, the first image effect may be changing luminance where the background region is output according to the information about the display state.

According to an embodiment, the second image effect may be displaying a shadow object, at least one of a length or an orientation of which differs, on the region of interest or a periphery of the region of interest depending on at least one of the information associated with the region of interest, the information associated with the display state, or the position of the virtual light source.

Figure 5:
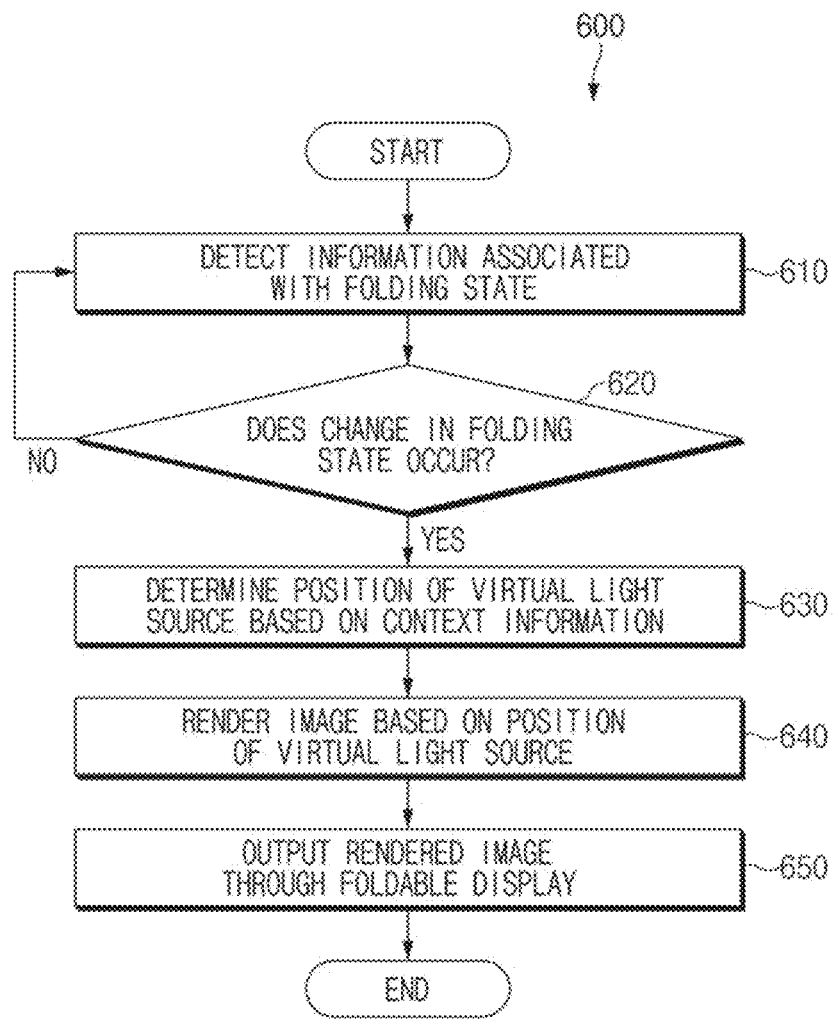
FIG. 5 is a flowchart illustrating a process of outputting an image in an electronic device, according to an embodiment.

FIG. 5 is a flowchart 600 illustrating a process of outputting an image in an electronic device, according to an embodiment.

In operation 610, the electronic device may detect information associated with a display state. For example, the electronic device detect a magnetic field of a magnet 323 using a hall sensor (e.g., a hall sensor 321 of FIG. 3). As another example, the electronic device may include an angle sensor (e.g., an angle sensor 330 of FIG. 3) capable of sensing a folded angle (e.g., a folded angle θ) according to an operation of a hinge portion. As another example, the folding sensor circuit may detect the information associated with the display state using at least one of an accelerometer or a gyroscope.

In operation 620, the electronic device may detect whether a change in the display state occurs. For example, when the display state of the electronic device changes from a folded mode to a table mode, the electronic device may determine the change in the display state based on the information detected in operation 610.

Context information refers to information for determining a context associated with the electronic device. For example, the context information may include information about an orientation of the electronic device. The information about the orientation of the electronic device may refer to information sensed by, for example, a motion sensor (e.g., an accelerometer or a gyroscope) to determine whether the electronic device is placed vertically (or longitudinally) or horizontally (or laterally) with respect to a horizontal plane. Alternatively or additionally, the information about the orientation of the electronic device may refer to classification (e.g., a landscape mode or a portrait mode) about a state of the electronic device according to the information sensed by the motion sensor. For example, the context information may include information associated with a time. The electronic device may obtain context information including a time corresponding to position information of the electronic device, which is obtained using a ground positioning system (GPS). As another example, the context information may include information associated with ambient illumination of the electronic device. According to an embodiment, the electronic device may include one or more illumination sensors. The electronic device may obtain context information including information about ambient illumination using the illumination sensor.

In operation 630, the electronic device may determine a position of a virtual light source based on the context information. For example, the electronic device may determine a coordinate value indicating a relative position between a specified position on a virtual boundary line and a display (e.g., a display 100 of FIG. 1) of the electronic device, depending on information about a bearing (or orientation) of the electronic device. The determined coordinate value may indicate the position of the virtual light source. As another example, the electronic device may determine the specified position on the virtual boundary line depending on the time included in the context information and may determine the position of the virtual light source based on the determined position. For example, the electronic device may determine a position corresponding to an orientation where an illumination sensor sensing illumination meeting a specified condition is disposed as the position of the virtual light source using the one or more illumination sensors.

In operation 640, the electronic device may render an image based on the position of the virtual light source. According to an embodiment, when assuming that there is a light source at the position of the virtual light source, the electronic device may render the image such that an optical effect occurring due to the light source is represented on a surface of the display (e.g., the display 100 of FIG. 1). For example, the electronic device may render the image such that a shadow formed on at least a partial region (e.g., a second region 102 of FIG. 1) of the display by a housing structure (e.g., a first housing structure 510 of FIG. 1) of at least a portion of the electronic device is represented. As another example, the electronic device may render the image such that a shadow object shaping a shadow formed when light is radiated from the visual light source to a visual object (e.g., a shape of an object) included in the image is represented. For example, the electronic device may render an image such that light radiated from the position of the virtual light source to the visual object included in the image is reflected in the image.

According to an embodiment, in operation 640, the information associated with the display state may be used in rendering the image. For example, the electronic device may differently determine an image effect applied to the image (e.g., a shadow region displayed on the image, a shape of a shadow object, a length of the shadow object, the number of visual objects, or luminance of the display which outputs the image) depending on a folded angle of the electronic device.

In operation 650, the electronic device may output the rendered image through the foldable display.

Herein, the process shown in FIG. 5 is only an example embodiment. It should be understood that the process of FIG. 5 may be changed in order, include additional operations, and that some of the operation may be replaced with other operations for achieving the same/similar effect. For example, according to the embodiment shown in FIG. 5, because the electronic device performs calculation for determining the position of the virtual light source according to context information when the user unfolds the electronic device, unnecessary repetition use of resources may occur. Thus, according to another embodiment, the electronic device may drive a sensor circuit at a low power, and may determine and store a position of the virtual light source using a program which operates information obtained using the sensor circuit in the background. The electronic device may render an image using the position of the virtual light source, which is stored in a memory (e.g., a memory 440 of FIG. 4), rather than performing calculation for determining a position of the virtual light source when the user unfolds the electronic device.

Figure 6:
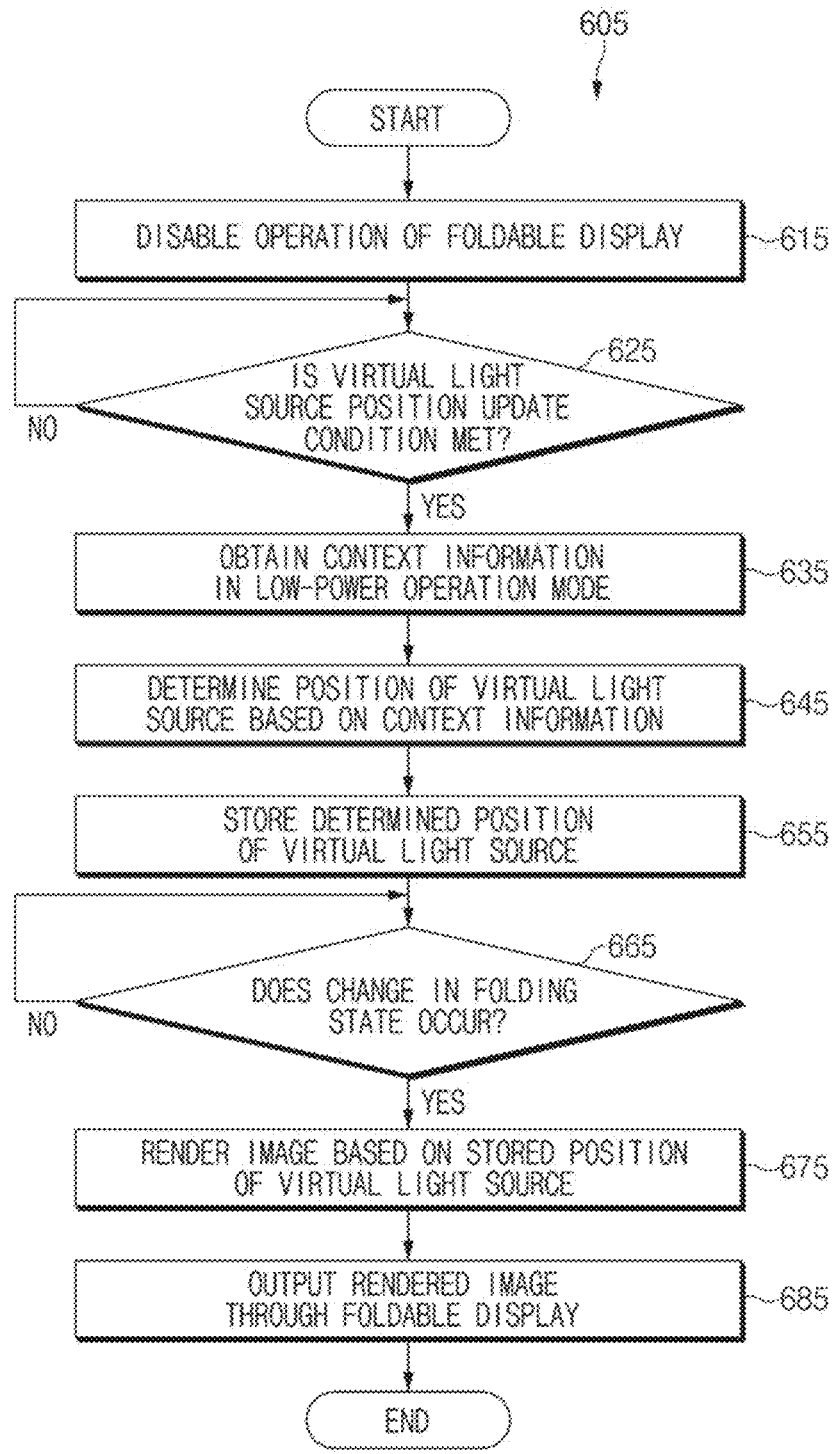
FIG. 6 is a flowchart illustrating a process of outputting an image in an electronic device, according to another embodiment.

FIG. 6 is a flowchart 605 illustrating a process of outputting an image in an electronic device, according to another embodiment.

In operation 615, when a specified event occurs, the electronic device may disable an operation of a foldable display. For example, when a display state of the electronic device is a folded state (e.g., FIG. 2), the electronic device may turn off the foldable display. As another example, when a user presses a sleep mode setting button of the electronic device, the foldable display may be disabled be turned off. Here, the operation of turning off the foldable display may refer to stop supplying power such that the foldable display does not output an image or operate in an operation mode (e.g., an always on display (AOD)) such that the foldable display outputs an image at a low power.

According to an embodiment, because there is a less need to continue updating a position of a virtual light source in real time, the position of the virtual light source may be updated only when a specified condition is met. The specified condition for performing an operation of updating the position of the virtual light source may be referred to as a virtual light source position update condition. In operation 625, the electronic device may determine whether information associated with the electronic device meets the virtual light source position update condition. For example, the virtual light source position update condition may include a predetermined period elapsing from a time that a virtual light source position was previously updated. As another example, the virtual light source position update condition may refer to moving the position of the electronic device according to an acceleration value sensed using an accelerometer of the electronic device or GPS coordinates obtained by means of a GPS module departs from a specified range. However, the one or more embodiments are not limited thereto.

When the information associated with the electronic device meets the virtual light source position update condition, in operation 635, the electronic device may obtain context information. For example, the electronic device may operate a component (e.g., a sensor circuit) of the electronic device for obtaining the context information in a low-power operation mode. In operation 645, the electronic device may determine a position of a virtual light source based on the context information.

In operation 655, the electronic device may store the determined position of the virtual light source in a memory (e.g., a memory 440 of FIG. 4). In operation 665, the electronic device may detect occurrence of a change in display state for the electronic device. In operation 675, when the change in display state occurs, the electronic device may render an image based on the stored position of the virtual light source. In operation 685, the electronic device may output the rendered image through the foldable display.

According to an embodiment, a method for outputting an image in an electronic device (e.g., an electronic device 10 of FIG. 1) may include obtaining context information associated with the electronic device, determining a position of a virtual light source with respect to a foldable display based on the context information, detecting information associated with a display state of at least one of a housing of the electronic device or the fordable display, rendering an image based on the information associated with the display state and the position of the virtual light source, when the information associated with the display state is changed, and outputting the rendered image through the foldable display (e.g., a display 100 of FIG. 1).

According to an embodiment, the obtaining of the context information may include obtaining information about an orientation of the electronic device. According to an embodiment, the determining of the position of the virtual light source may include determining the position of the virtual light source based on the information about the orientation.

According to an embodiment, the obtaining of the context information may include obtaining at least one illumination value for illumination around the electronic device and determining an orientation corresponding to an illumination value meeting a specified condition among the at least one illumination value. According to an embodiment, the electronic device may obtain the at least one illumination value using a sensor circuit including an illumination sensor. The determining of the position of the virtual light source may include determining the position of the virtual light source based on the determined orientation.

According to an embodiment, the rendering of the image may include rendering the image such that the number of visual objects included in the image or luminance outputting at least a portion of the image is changed depending on a change in the display state.

According to an embodiment, the obtaining of the context information may include obtaining information about an orientation of the electronic device. The method for outputting the image in the electronic device may include determining a shadowing application mode associated with a shadowing effect based on the information about the orientation. The rendering may include determining a shadow region where a shadowing effect will be displayed based on the information associated with the display state and the position of the virtual light source depending on the shadowing application mode and rendering the image such that the shadowing effect is displayed on the determined shadow region.

According to an embodiment, the rendered image may include a visual object and a shadow object corresponding to the visual object. The rendering may include rendering the image such that the shadow object is displayed in a length determined according to the information associated with the display state.

According to an embodiment, the method for outputting the image in the electronic device may include obtaining a basic image and dividing the basic image into a background region and a region of interest. The rendering of the image may include applying a first image effect corresponding to the information associated with the display state to the basic region and applying a second image effect corresponding to at least one of information associated with the region of interest, the information associated with the display state, or the position of the virtual light source to the basic image.

According to an embodiment, the first image effect may be changing luminance where the background region is output according to the information about the display state. The second image effect may be displaying a shadow object, at least one of a length or an orientation of which differs, on the region of interest or a periphery of the region of interest depending on at least one of the information associated with the region of interest, the information associated with the display state, or the position of the virtual light source.

Figure 7:
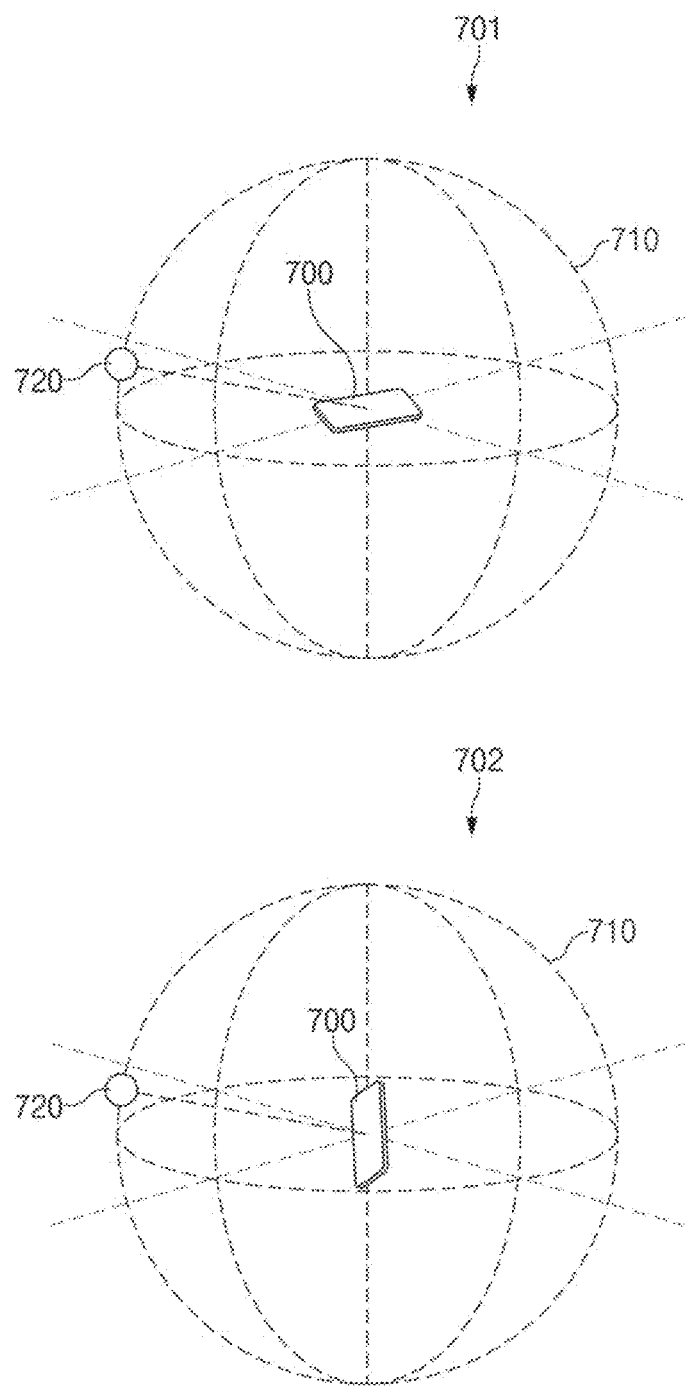
FIG. 7 conceptually illustrates a method for determining a position of a virtual light source in an electronic device, according to an embodiment.

FIG. 7 conceptually illustrates a method for determining a position of a virtual light source 720 in an electronic device 700, according to an embodiment.

According to an embodiment, assuming that there is a virtual light source 720 on a virtual boundary surface 710, the electronic device 700 may determine a relative position of the virtual light source 720 with respect to the electronic device 700 based on information about an orientation (or a bearing) of the electronic device 700.

For example, when the electronic device 700 is a state where the electronic device 700 is oriented laterally (701), the electronic device 700 may determine the virtual light source 720 is located at a certain direction with respect to a horizontal plane on which a display (e.g., a display 100 of FIG. 1) of the electronic device 700 is disposed. As another example, when the electronic device 700 is a state where the electronic device 700 is oriented longitudinally (702), the electronic device 700 may determine the virtual light source 720 is located at a certain direction with respect to a vertical plane on which a display (e.g., a display 100 of FIG. 1) of the electronic device 700 is disposed.

Figure 8:
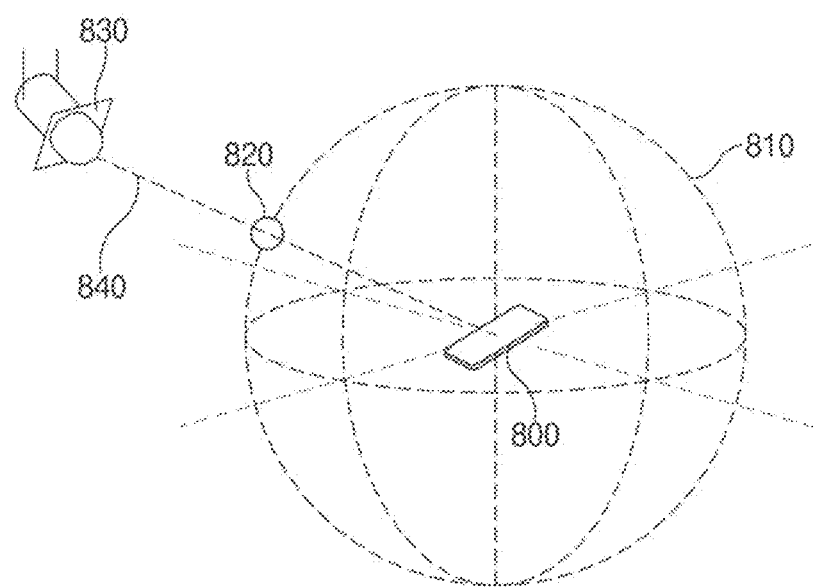
FIG. 8 conceptually illustrates a method for determining a position of a virtual light source in an electronic device according to another embodiment.

FIG. 8 conceptually illustrates a method for determining a position of a virtual light source 820 in an electronic device 800, according to an embodiment.

The electronic device 800 may detect an orientation of a light source 830 which radiates light to the electronic device 800 using a sensor (e.g., an illumination sensor) which senses light. For example, the electronic device 800 may include a plurality of illumination sensors arranged in several directions and may compare illumination values respectively detected from the plurality of illumination sensors with each other or with a specified value. The electronic device 800 may detect a direction having the highest illumination value according to illumination values obtained by one of the plurality of illumination sensors and determine the orientation of the light source 830 with respect to the electronic device 800. Alternatively or additionally, the electronic device 800 may detect a direction having an illumination value that is greater than or equal to a specified value based on illumination values obtained by a plurality of illumination sensors and determine the orientation of the light source 830 with respect to the electronic device 800.

According to an embodiment, the electronic apparatus 800 may determine a position of the virtual light source 820 based on the detected orientation of the light source 830. For example, the electronic device 800 may determine a position where a straight line 820 extended in the orientation of the light source 830, which is detected from the position of the electronic device 800, and a virtual boundary surface 810 are met as the position of the virtual light source 820.

Figure 9:
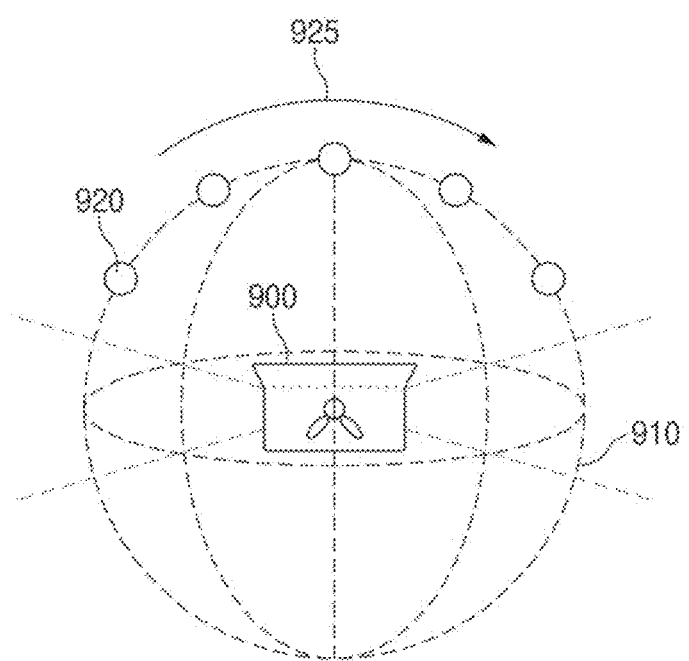
FIG. 9 conceptually illustrates a position of a virtual light source changed over time, according to an embodiment.

FIG. 9 conceptually illustrates a position of a virtual light source 920 changed over time, according to an embodiment.

According to an embodiment, environmental information may include information about a time. For example, an electronic device 900 may obtain information about a time corresponding to position information of the electronic device 900, which is obtained using a ground positioning system (GPS).

According to an embodiment, the electronic device 900 may move with respect to a position of the virtual light source 920 as the time elapses. Alternatively, the virtual light source 920 may move with respect to the position of the electronic device 900. Referring to FIG. 9, the virtual light source 920 may move with respect to the position of the electronic device 900 in a specified direction along the virtual boundary surface 910 as the time elapses.

Figure 10:
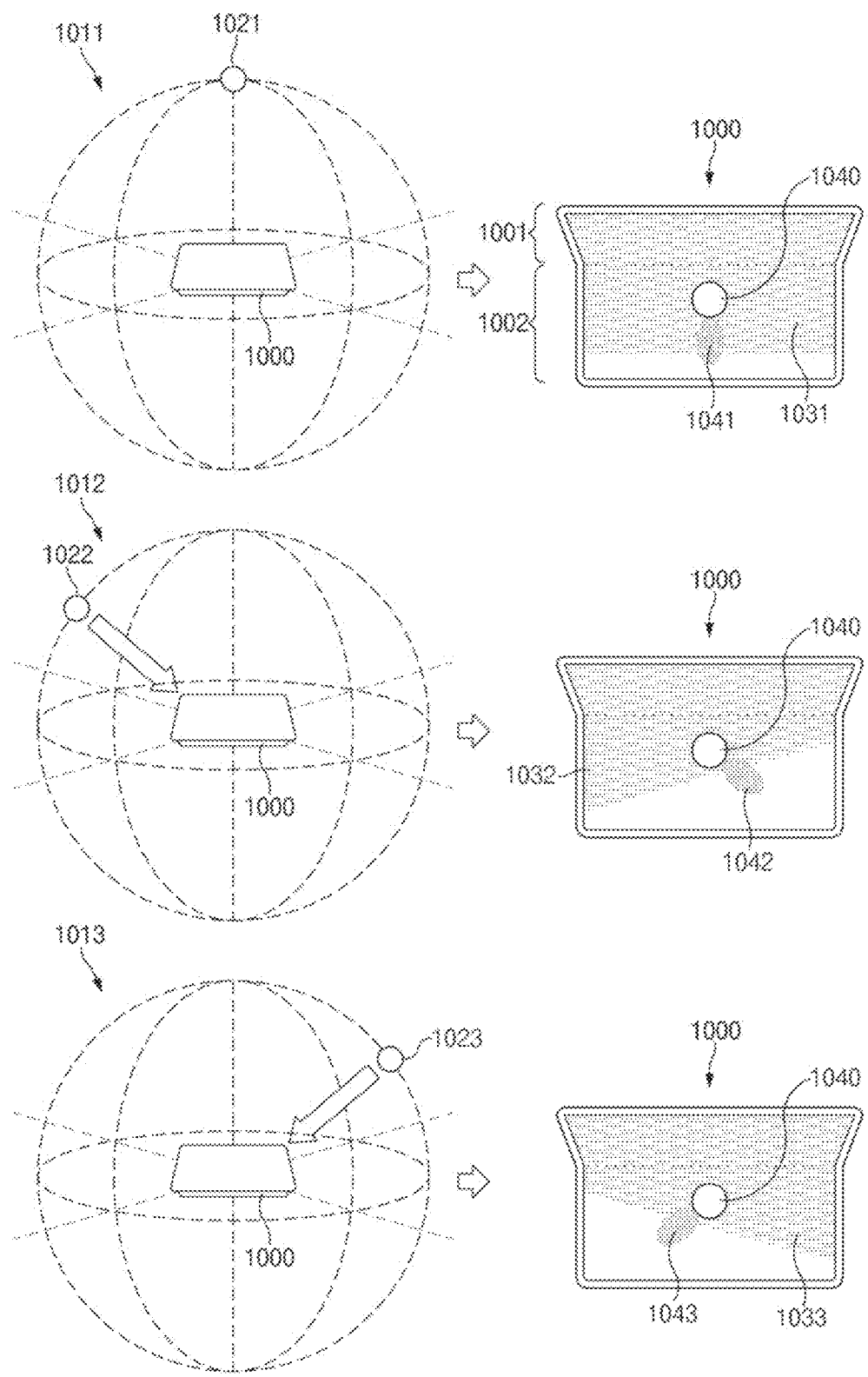
FIG. 10 illustrates an example of an electronic device for rendering a shadow region and a shadow object depending on a position of a virtual light source, according to an embodiment.

FIG. 10 illustrates examples of an electronic device 1000 rendering a shadow regions 1031, 1032 and 1033, and shadow objects 1041, 1042 and 1043 depending on a position of virtual light sources 1021, 1022 and 1023, according to an embodiment.

According to an embodiment, the electronic device 1000 may determine a shadow region based on at least one of the position of the virtual light source 1021, 1022, or 1023 or a folded angle of the electronic device 1000. The electronic device 1000 may render an image depending on the determined shadow region.

Referring to FIG. 10, when it is determined that the virtual light source 1021 is located in a rear upper direction of a first region 1001 of the electronic device 1000, the electronic device 1000 may determine the first partial region 1031 in a second region 1002 as a shadow region. The electronic device 1000 may further determine all of the first region 1001 as the shadow region. In the disclosure, the shadow region may refer to a region where a shadowing effect is displayed such that a user recognizes that a shadow is formed in the shadow region. For example, the electronic device 1000 may render an image such that a luminance of the image is output at a lower luminance in the shadow region than a luminance of the image in a region other than the shadow region. Accordingly, the shadowing effect is displayed in the shadow region. According to an embodiment, intensity of the shadowing effect applied to the shadow region may be determined based on at least one of illumination outside the electronic device or a folded angle of the electronic device 1000. For example, the lower the illumination value obtained by the illumination sensor, the more the electronic device 1000 may increase intensity of the shadowing effect. As another example, the smaller the folded angle, the more the electronic device 1000 may increase intensity of the shadowing effect. The greater the folded angle of the electronic device 100, the smaller the area of the shadow region 1031.

When it is determined that the virtual light source 1022 is located in a rear left direction of the first region 1001 of the electronic device 1000, the electronic device 1000 may determine the second partial region 1032 as a shadow region. Similarly, when it is determined that the virtual light source 1022 is located in a rear right direction of a first region 1001 of the electronic device 1000, the electronic device 1000 may determine the third partial region 1033 as a shadow region.

As shown in FIG. 10, the electronic device 1000 may apply and output the shadowing effect to the shadow region. The electronic device 1000 may provide new aesthetic user experience, in which light is blocked by the first region 1001 from a light source and a shadow appears on the image, which may be visually recognized by a user.

According to an embodiment, the electronic device 1000 may render an image such that the shadow object 1041, 1042, or 1043 is displayed based on a position of the virtual light source 1021, 1022, or 1023. In the disclosure, the shadow object (e.g., 1041, 1042, or 1043) may refer to visually representing a shadow which appears when light is radiated from the virtual light source (e.g., 1021, 1022, or 1023) to a visual object (e.g., 1040) included in the image displayed by the electronic device 1000. According to an embodiment, the electronic device 1000 may determine at least one of an orientation, a length, a darkly displayed degree, or a shape of the shadow object 1041, 1042, or 1043 based on the position of the virtual light source 1021, 1022, or 1023. According to an embodiment, the electronic device 1000 may render an image such that the shadow object 1041, 1042, or 1043 is displayed in a direction opposite to the position of the virtual light source 1021, 1022, or 1023 with respect to the visual object 1040.

Figure 11:
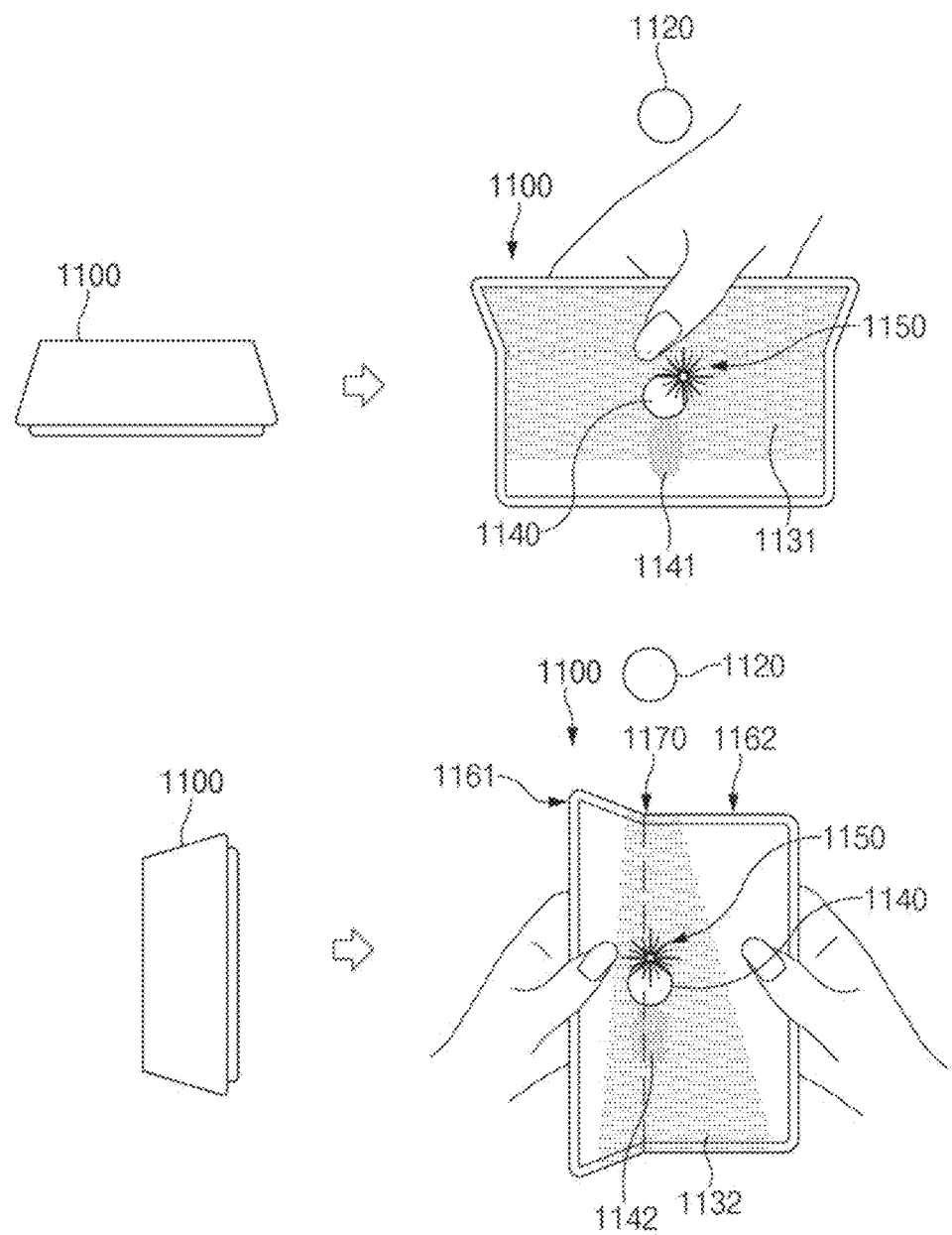
FIG. 11 illustrates an example of an electronic device for displaying an image depending on an orientation of the electronic device that is unfolded, according to an embodiment.

FIG. 11 illustrates an example of an electronic device 1100 for displaying an image depending on an orientation placed when an electronic device 1100 is unfolded, according to an embodiment.

According to an embodiment, the electronic device 1100 may include a sensor circuit (e.g., an accelerometer or a gyroscope) capable of detecting information about an orientation where the electronic device 1100 is placed. The electronic device 1100 may determine a shadowing application mode associated with a shadowing effect based on the information about the orientation of the electronic device 1100, which is obtained by the sensor circuit. The shadowing application mode may be a mode of applying a shadowing effect to an image. For example, the shadowing application mode may be a horizontal mode or a vertical mode.

When the electronic device is placed horizontally, the electronic device 1100 may determine the shadowing application mode as a landscape mode. When the shadowing application mode is the horizontal mode and when the position of a virtual light source 1120 is determined, the electronic device 1100 may determine a shadow region 1131 to which the shadowing effect will be applied in a horizontal direction. Referring to FIG. 11, the electronic device 1100 may determine all of a first region (e.g., a first region 101 of FIG. 1) of a display (e.g., a display 100 of FIG. 1) and a portion of a second region (e.g., second region 102 of FIG. 1) as the shadow region 1131. According to an embodiment, the electronic device may render an image such that at least one of a shadow object 1141 or a reflected light object 1150 for a visual object 1140 included in the image is further represented.

When the electronic device 1100 is placed vertically, the electronic device 1100 may determine the shadowing application mode as a portrait mode. When the shadowing application mode is the portrait mode and when the position of the virtual light source 1120 is determined, the electronic device 1100 may determine a region different from when the shadowing application mode is the landscape mode as the shadow region 1132. According to an embodiment, the electronic device 1100 may render an image such that a shadowing effect is displayed on a region adjacent to an axis 1170 at which the display is folded in a first portion 1161 of the display and a region adjacent to an axis 1170 in a second portion 1162. According to an embodiment, the electronic device may render an image such that at least one of the shadow object 1142 or the reflected light object 1150 for the visual object 1140 included in the image is further represented.

Figure 12:
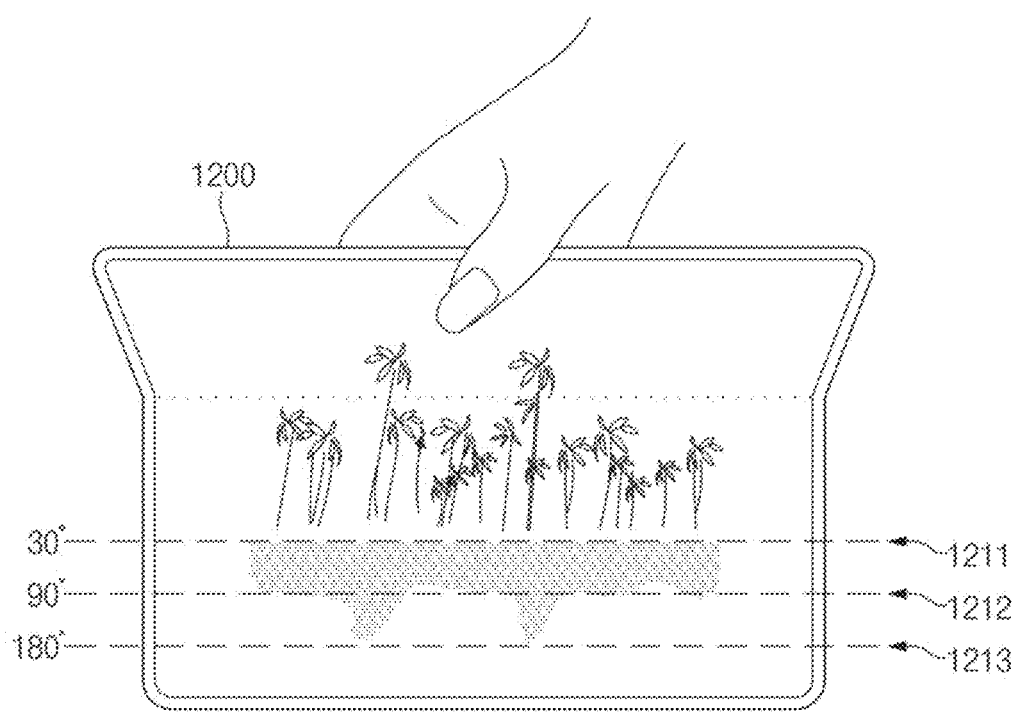
FIG. 12 illustrates an example of an electronic device for outputting an image depending on a folded angle, according to an embodiment.

FIG. 12 illustrates an example of an electronic device 1200 for outputting an image depending on a folded angle, according to an embodiment.

According to an embodiment, the electronic device 1200 may determine a length of a shadow object included in an image output based on a folded angle. For example, referring to FIG. 12, when the folded angle is 30 degrees, the electronic device 1200 may render an image such that a shadow object for a visual object is displayed to a first line 1211. When the folded angle is 90 degrees, the electronic device 1200 may render the image such that the shadow object for the visual object is displayed to a second line 1212. When the folded angle is 180 degrees, the electronic device 1200 may render the image such that the shadow object for the visual object is displayed to a third line 1213. Alternatively or additionally, for example, when the folded angle is 180 degrees, the electronic device 1200 may render the image such that the shadow object is not displayed.

Figure 13:
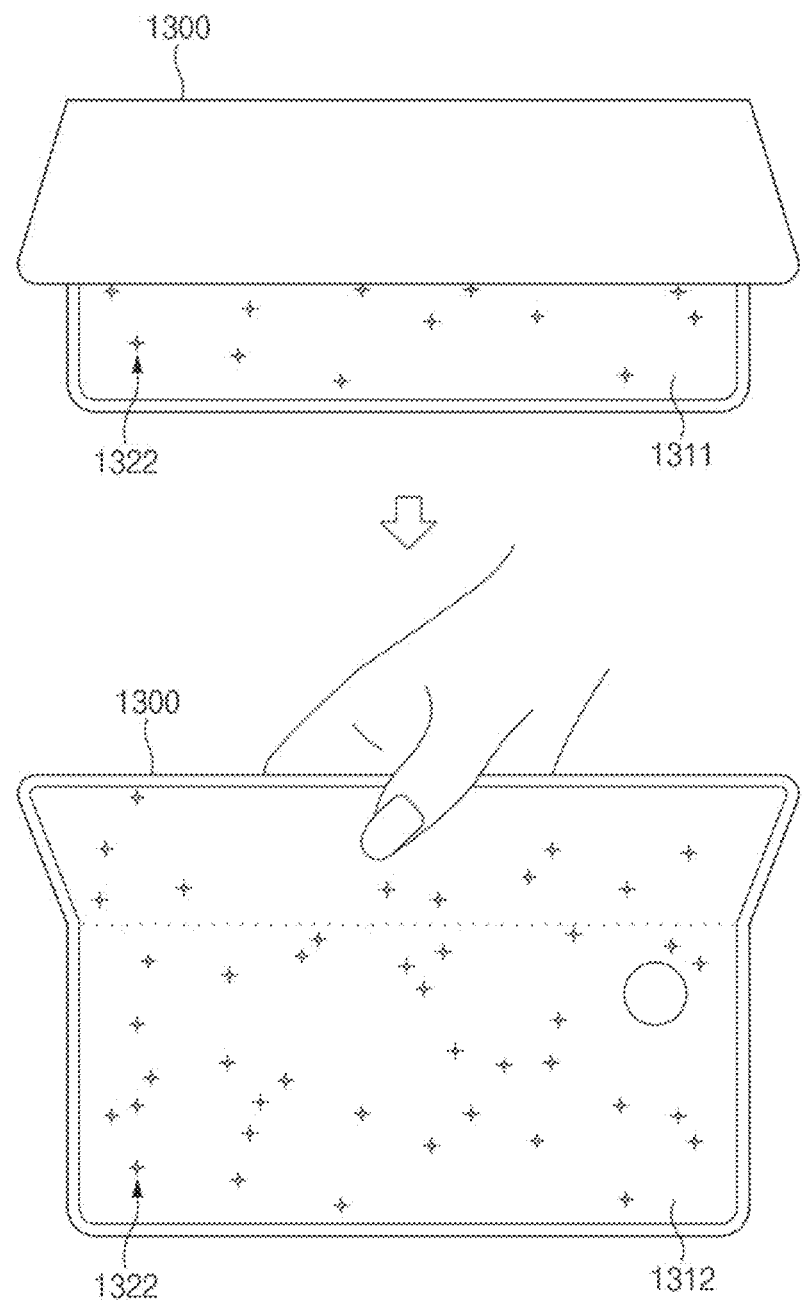
FIG. 13 illustrates an example of an electronic device for outputting an image including a visual object depending on a folded angle, according to an embodiment.

FIG. 13 illustrates an example of an electronic device 1300 for outputting an image including a visual object depending on a folded angle, according to an embodiment.

According to an embodiment, when the electronic device 1300 increases its folded angle while unfolded, the electronic device 1300 may gradually increase luminance of an image output through a display. Referring to FIG. 13, when the folded angle is small, the electronic device 1300 may display the image at low luminance.

Furthermore, as the folded angle increases, the electronic device 1300 may increase the number of visual objects (e.g., light sources) displayed on the displayed image. For example, referring to FIG. 13, when the folded angle is relatively small, the electronic device 1300 may display a few star images 1321. As the folded angle increases, the electronic device 1300 may output an image including more star images 1321.

Figure 14:
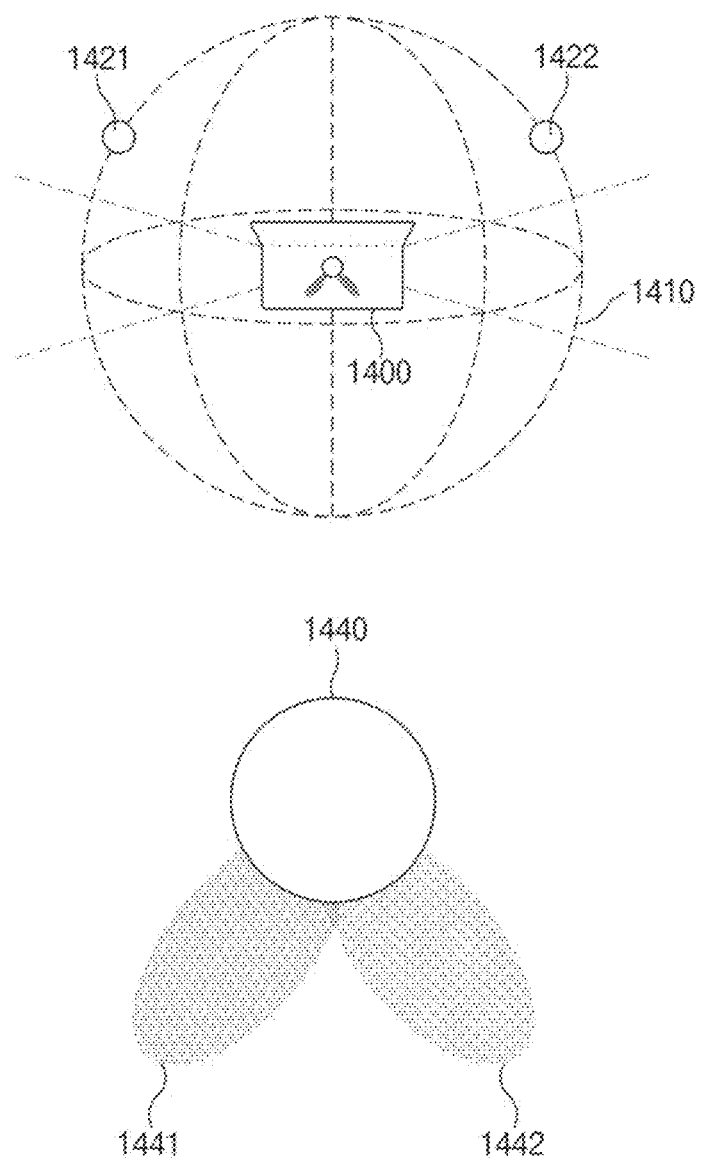
FIG. 14 illustrates a method for outputting shadow objects based on a plurality of virtual light sources in an electronic device, according to an embodiment.

FIG. 14 illustrates a method for outputting shadow objects 1441 and 1442 based on a plurality of virtual light sources 1421 and 1422 in an electronic device 1400, according to an embodiment.

According to an embodiment, the electronic device 1400 may determine positions of the plurality of light sources 1421 and 1422 on a boundary surface 1410. When the plurality of light sources 1421 and 1422 are determined, the electronic device 1400 may render an image such that a first shadow object 1442 is displayed with respect to a position of a first light source 1421 and a second shadow object 1441 is displayed with respect to a position of a second virtual light source 1422 about a visual object 1440 included in the output image.

Figure 15:
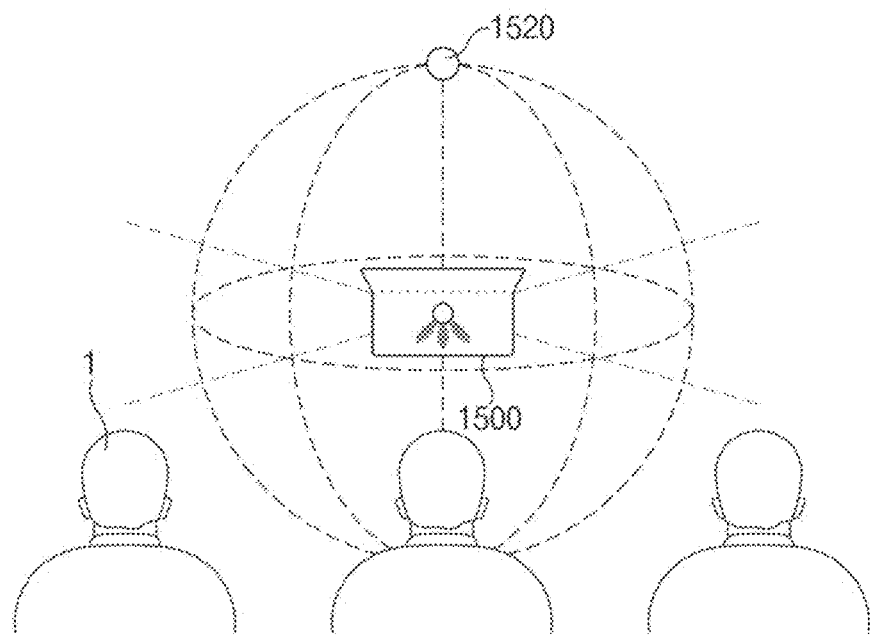
FIG. 15 is a diagram illustrating a method for outputting an image based on a position of a user with respect to an electronic device, according to an embodiment.

FIG. 15 is a diagram illustrating a method for outputting an image based on a position of a user 1 in an electronic device 1500, according to an embodiment.

According to an embodiment, there is only one virtual light source 1520, and the electronic device 1500 may render an image such that different image effects are applied according to positions of a plurality of users. For example, the electronic device 1500 may apply a different shadowing effect to be viewed by the user 1 as opposed to other users even when the position of the virtual light source 1520 does not change.

Figure 16:
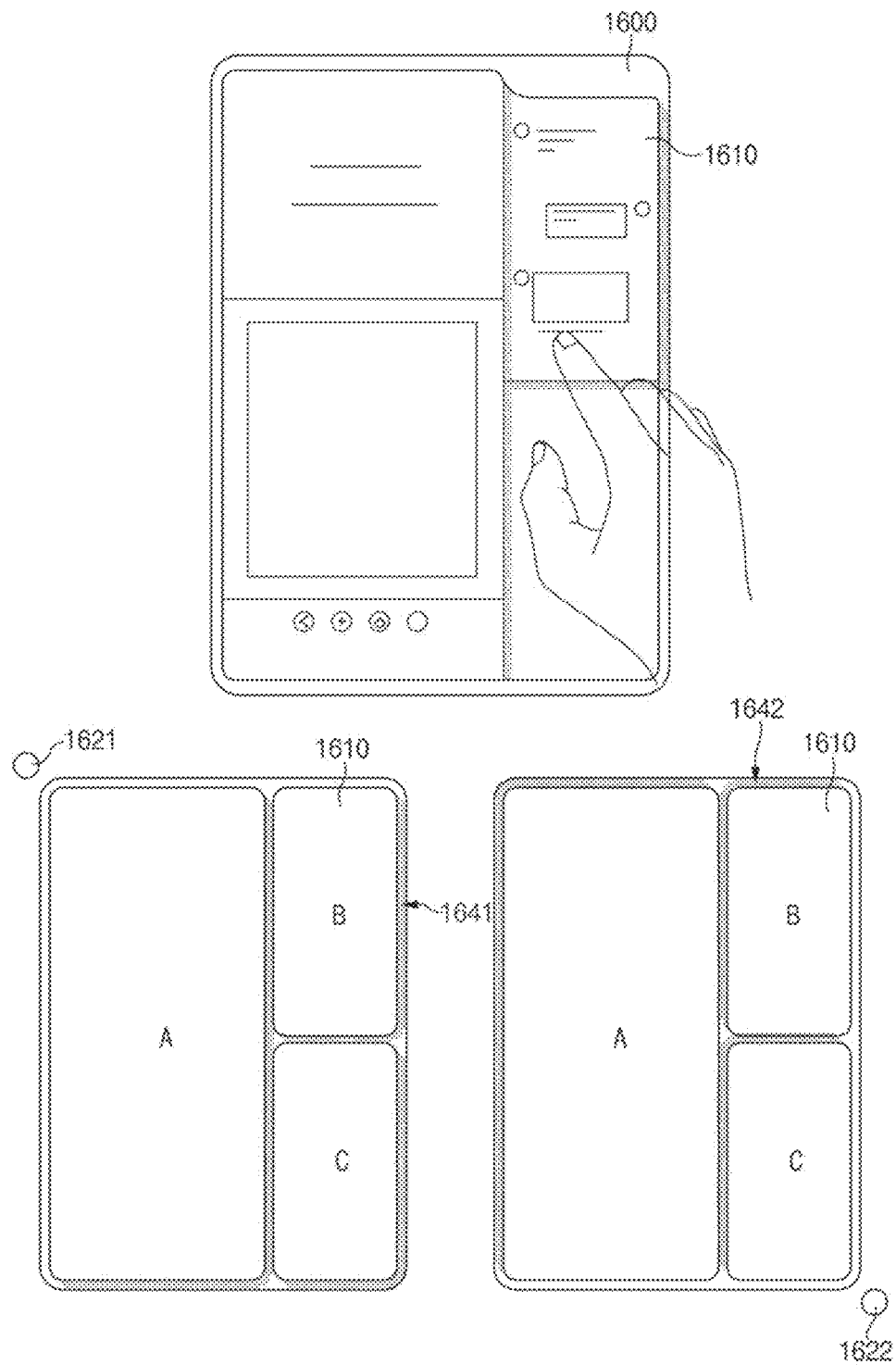
FIG. 16 is a diagram illustrating a method for outputting an image including a task window based on a position of a virtual light source in an electronic device, according to an embodiment.

FIG. 16 is a diagram illustrating a method for outputting an image including a task window 1610 based on a position of a virtual light source in an electronic device 1600, according to an embodiment.

The electronic device 1600 may output the result of performing a task of the electronic device 1600 or may display one or more task windows 1610 for receiving a user input. According to an embodiment, the electronic device 1600 may apply an image effect associated with the task window 1610 to an image depending on a position of a virtual light source.

Referring to FIG. 16, when the position of the virtual light source 1621 is at a left upper end of a display of the electronic device 1600, the electronic device 1600 may display a shadow effect 1641 on a right lower end in the periphery of the task window 1610. In addition, the shadow effect 1641 may be applied to a plurality of task windows 1610A, 1610B and 1610C. When the position of the virtual light source 1622 is a right lower end of the display of the electronic device 1600, the electronic device 1600 may display the shadow effect 1642 on the left upper end in the periphery of the task window 1610. In addition, the shadow effect 1642 may be applied the plurality of task windows 1610A, 1610B and 1610C.

Figure 17:
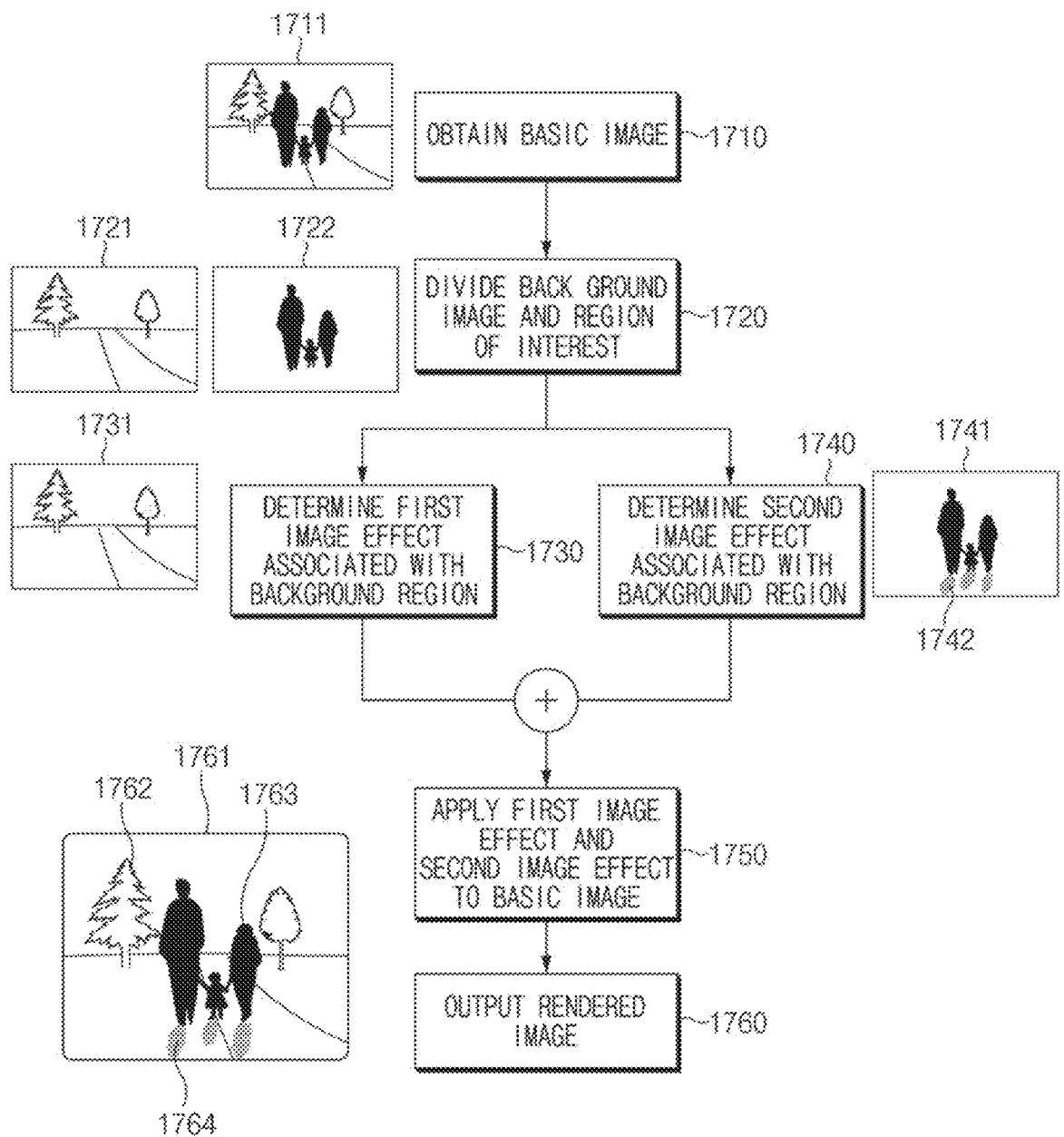
FIG. 17 is a flowchart illustrating a process of rendering an image in an electronic device, according to an embodiment.

FIG. 17 is a flowchart illustrating a process of rendering an image in an electronic device (e.g., an electronic device 10 of FIG. 1), according to an embodiment.

According to an embodiment, in operation 1710, the electronic device may obtain a basic image 1711 including image data to be displayed on a display (e.g., a display 100 of FIG. 1), when unfolded. For example, the electronic device may be running a photo management application and may receive a user input selecting one or more of images stored in the electronic device from a user. As another example, the electronic device may receive the basic image 1711 from an external device.

In operation 1720, the electronic device may divide the basic image 1711 into a background region 1721 and a region of interest 1722. According to an embodiment, the electronic device may extract a background layer including the background region 1721 and an interest object layer including the region of interest 1722 from the basic image

1711. The region of interest may refer to a region including a visual object (e.g., a shape of a person) the user may recognize as an important object in an image. For example, the electronic device may extract an edge from the basic image and may classify an object, recognized based on the edge, based on a feature point of a shape of the object. The electronic device may select an object to be included a region of interest among the recognized objects based on the result of classifying the object.

In operation 1730, the electronic device may determine a first image effect associated with the background region. The first image effect may mean that, as the electronic device is unfolded, luminance where the background region is output gradually increases, depending on information about a display state.

In operation 1740, the electronic device may determine a second image effect associated with the region of interest. According to an embodiment, the second image effect may refer to rendering an image based on at least one of information associated with the region of interest, information associated with a display state, or a position of a virtual light source. For example, the electronic device may render an image such that a shadow object 1742 shaping a shadow which appears when light is radiated from the position of the virtual light source, with respect to a position where the region of interest is located in the image, gradually changes in length or gradually fades, while the electronic device is unfolded.

In operation 1750, the electronic device may apply the first image effect and the second image effect to the basic image 1711. According to an embodiment, the electronic device may combine a background layer 1731 to which the first image effect is applied with an interest object layer 1741 to which the second image effect is applied (e.g., where the shadow object is displayed).

In operation 1760, the electronic device may render an image 1761 to which the first image effect and the second image effect are applied and may output the rendered image through its display. According to an embodiment, the image 1761 to which the first image effect and the second image effect are applied may include a background region 1762 displayed on the first image effect and a region of interest 1763 on which a visual object is displayed. The image 1761 to which the first image effect and the second image effect are applied may include may include a shadow object 1764 displayed on the region of interest 1763 or a periphery of the region of interest 1763.

Figure 18:
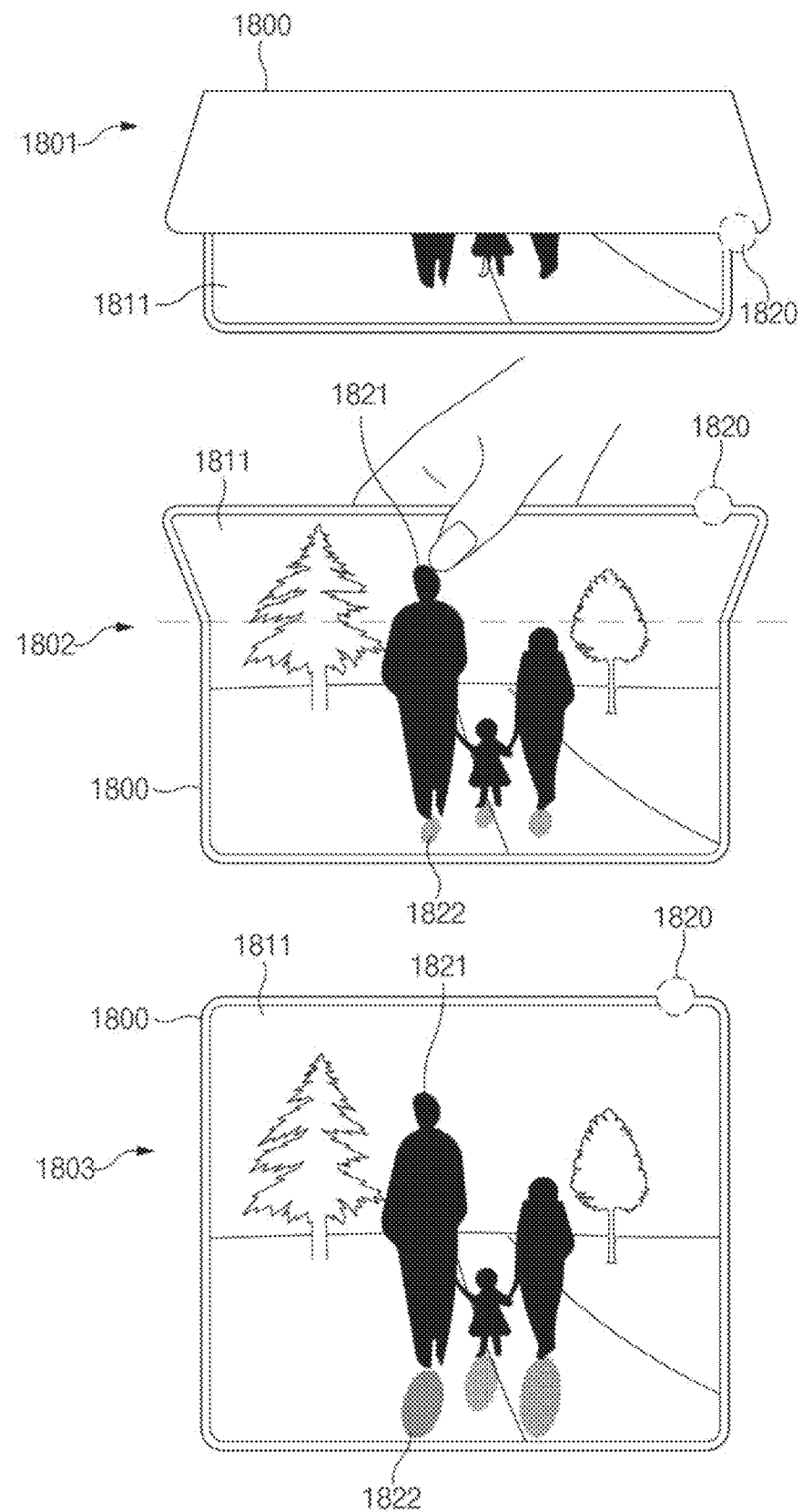
FIG. 18 illustrates an example of an electronic device for outputting a rendered image, according to an embodiment.

FIG. 18 illustrates an example of an electronic device 1800 for outputting a rendered image, according to an embodiment.

According to an embodiment, when the electronic device 1800 starts to be unfolded from a state where it is folded or in the intermediate state between the folded state and the unfolded state (1801), it may enable a disabled display and may output a specified image through its display. The electronic device 1800 may output a background region 1811 of the image at low luminance. For example, the electronic device 1800 may output the background region 1811 of the image at luminance corresponding to 20 percent of an original luminance value.

The electronic device 1800 may determine a position of a virtual light source 1820. When the electronic device 1800 is further unfolded (when a folded angle increases), the electronic device 1800 may gradually increase luminance where the background region 1811 is output. The electronic device 1800 may display a shadow object 1822 according to an orientation and a length of a shadow which appears when light is radiated to a virtual object 1821 in a region of interest from the position of the virtual light source 1820.

When the electronic device 1800 is fully unfolded (1803), the electronic device 1800 may display the background region 1811 depending on the original luminance value. Referring to FIG. 18, the electronic device 1800 may display the shadow object 1822, a length of which increases when the electronic device 1800 is maximally unfolded.

Figure 19:
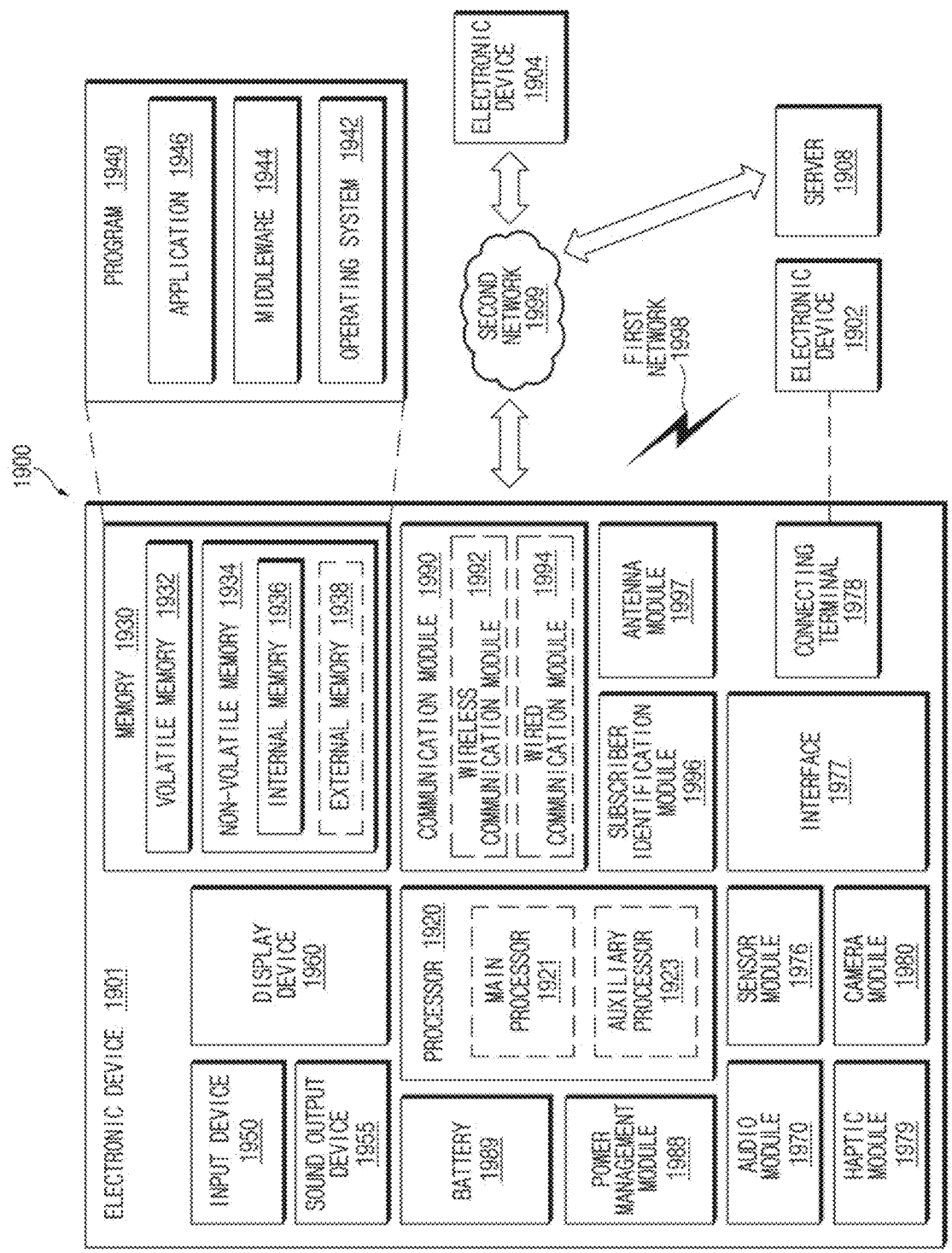
FIG. 19 illustrates a block diagram of an electronic device in a network environment according to an embodiment.

FIG. 19 is a block diagram illustrating an electronic device 1901 in a network environment 1900 according to various embodiments. Referring to FIG. 19, the electronic device 1901 in the network environment 1900 may communicate with an electronic device 1902 via a first network 1998 (e.g., a short-range wireless communication network), or at least one of an electronic device 1904 or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor 1920, a memory 1930, an input device 1950, a sound output device 1955, a display device 1960, an audio module 1970, a sensor module 1976, an interface 1977, a connecting terminal 1978, a haptic module 1979, a camera module 1980, a power management module 1988, a battery 1989, a communication module 1990, a subscriber identification module (SIM) 1996, or an antenna module 1997. In some embodiments, one or more components may be omitted from the electronic device 1901, or one or more other components may be added in the electronic device 1901. In some embodiments, some of the components (e.g., the sensor module 1976, the camera module 1980, or the antenna module 1997) may be implemented as a single or integrated component (e.g., the display module 1960).

The processor 1920 may execute, for example, software (e.g., a program 1940) to control at least one other component (e.g., a hardware or software component) of the electronic device 1901 coupled with the processor 1920, and may perform various data processing or computation. According to one embodiment, as at least part of the data processing or computation, the processor 1920 may store a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., a central processing unit (CPU) or an application processor (AP)), or an auxiliary processor 1923 (e.g., a graphics processing unit (GPU), a neural processing unit (NPU), an image signal processor (ISP), a sensor hub processor, or a communication processor (CP)) that is operable independently from, or in conjunction with, the main processor 1921. For example, when the electronic device 1901 includes the main processor 1921 and the auxiliary processor 1923, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display module 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an image signal processor or a communication processor) may be implemented as part of another component (e.g., the camera module 1980 or the communication module 1990) functionally related to the auxiliary processor 1923. According to an embodiment, the auxiliary processor 1923 (e.g., the neural processing unit) may include a hardware structure specified for artificial intelligence model processing. An artificial intelligence model may be generated by machine learning. Such learning may be performed, e.g., by the electronic device 1901 where the artificial intelligence is performed or via a separate server (e.g., the server 1908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1930 may store various data used by at least one component (e.g., the processor 1920 or the sensor module 1976) of the electronic device 1901. The various data may include, for example, software (e.g., the program 1940), input data or output data for executing a command. The memory 1930 may include the volatile memory 1932 or the non-volatile memory 1934.

The program 1940 may be stored in the memory 1930 as software, and may include, for example, an operating system (OS) 1942, middleware 1944, or an application 1946.

The input module 1950 may receive a command or data to be used by another component (e.g., the processor 1920) of the electronic device 1901, from the outside (e.g., a user) of the electronic device 1901. The input module 1950 may include, for example, a microphone, a mouse, a keyboard, a key (e.g., a button), or a digital pen (e.g., a stylus pen).

The sound output module 1955 may output sound signals to the outside of the electronic device 1901. The sound output module 1955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1960 may visually provide information to the outside (e.g., a user) of the electronic device 1901. The display module 1960 may include, for example, a display, a hologram device, or a projector and control circuitry to control a corresponding one of the display, hologram device, and projector. According to an embodiment, the display module 1960 may include a touch sensor adapted to detect a touch, or a pressure sensor adapted to measure the intensity of force incurred by the touch.

The audio module 1970 may convert a sound into an electrical signal and vice versa. According to an embodiment, the audio module 1970 may obtain the sound via the input module 1950, or output the sound via the sound output module 1955 or a headphone of an external electronic device (e.g., an electronic device 1902) directly (e.g., wiredly) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1977 may support one or more specified protocols to be used for the electronic device 1901 to be coupled with the external electronic device (e.g., the electronic device 1902) directly (e.g., wiredly) or wirelessly. According to an embodiment, the interface 1977 may include, for example, a high definition multimedia interface (HDMI), a universal serial bus (USB) interface, a secure digital (SD) card interface, or an audio interface.

A connecting terminal 1978 may include a connector via which the electronic device 1901 may be physically connected with the external electronic device (e.g., the electronic device 1902). According to an embodiment, the connecting terminal 1978 may include, for example, a HDMI connector, a USB connector, a SD card connector, or an audio connector (e.g., a headphone connector).

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, for example, a motor, a piezoelectric element, or an electric stimulator.

The camera module 1980 may capture a still image or moving images. According to an embodiment, the camera module 1980 may include one or more lenses, image sensors, image signal processors, or flashes.

The power management module 1988 may manage power supplied to the electronic device 1901. According to one embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment, the communication module 1990 may include a wireless communication module 1992 (e.g., a cellular communication module, a short-range wireless communication module, or a global navigation satellite system (GNSS) communication module) or a wired communication module 1994 (e.g., a local area network (LAN) communication module or a power line communication (PLC) module). A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The wireless communication module 1992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1992 may support a high-frequency band (e.g., the mmWave band) to achieve, e.g., a high data transmission rate. The wireless communication module 1992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1992 may support various requirements specified in the electronic device 1901, an external electronic device (e.g., the electronic device 1904), or a network system (e.g., the second network 1999). According to an embodiment, the wireless communication module 1992 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1997 may transmit or receive a signal or power to or from the outside (e.g., the external electronic device) of the electronic device 1901. According to an embodiment, the antenna module 1997 may include an antenna including a radiating element composed of a conductive material or a conductive pattern formed in or on a substrate (e.g., a printed circuit board (PCB)). According to an embodiment, the antenna module 1997 may include a plurality of antennas (e.g., array antennas). In such a case, at least one antenna appropriate for a communication scheme used in the communication network, such as the first network 1998 or the second network 1999, may be selected, for example, by the communication module 1990 (e.g., the wireless communication module 1992) from the plurality of antennas. The signal or the power may then be transmitted or received between the communication module 1990 and the external electronic device via the selected at least one antenna. According to an embodiment, another component (e.g., a radio frequency integrated circuit (RFIC)) other than the radiating element may be additionally formed as part of the antenna module 1997.

According to various embodiments, the antenna module 1997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 or 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, mobile edge computing (MEC), or client-server computing technology may be used, for example. The electronic device 1901 may provide ultra low-latency services using, e.g., distributed computing or mobile edge computing. In another embodiment, the external electronic device 1904 may include an internet-of-things (IoT) device. The server 1908 may be an intelligent server using machine learning and/or a neural network. According to an embodiment, the external electronic device 1904 or the server 1908 may be included in the second network 1999. The electronic device 1901 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein, and may include various changes, equivalents, or replacements. In the disclosure, similar reference numerals may be used to refer to similar or related elements. It is to be understood that a singular form may include plural form, unless the context clearly indicates otherwise. In the disclosure, the expression "at least one of a, b or c" indicates only a, only b, only c, both a and b, both a and c, both b and c, or all of a, b, and c. As used herein, such terms as "1st" and "2nd," or "first" and "second" may be used to simply distinguish one component from another, and may not be construed as limiting the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1940) including one or more instructions that are stored in a storage medium (e.g., internal memory 1936 or external memory 1938) that is readable by a machine (e.g., the electronic device 1901). For example, a processor (e.g., the processor 1920) of the machine (e.g., the electronic device 1901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
    a housing comprising a first housing structure and a second housing structure foldable with respect to the first housing structure about a first axis;
    a foldable display foldable about a second axis parallel to the first axis, wherein the foldable display includes a first portion coupled to the first housing structure and a second portion coupled to the second housing structure, and the first portion is foldable with respect to the second portion about the second axis;
    a folding sensor circuit configured to detect a display state of at least one of the housing or the foldable display;
    an orientation sensing circuit configured to detect an orientation of the electronic device;
    a memory storing instructions; and
    a processor configured to execute the instructions stored in the memory to:
        identify whether a specified condition for determining a position of a virtual light source is satisfied, wherein the specified condition includes at least one of a change of the display state, a predetermined period elapsing, or movement of the electronic device out of a specified range;
        in response to satisfaction of the specified condition, determine the position of the virtual light source with respect to the foldable display based on context information associated with the electronic device, wherein the context information includes at least one of an orientation of the electronic device, time information, or illumination around the electronic device;
        render an image based on the display state detected by the folding sensor circuit and the position of the virtual light source; and
    control the foldable display to display the rendered image, wherein the processor is further configured to:
        determine a shadow region on which a shadowing effect is to be applied in the second portion based on the display state and the position of the virtual light source;
        determine a shadowing application mode associated with the shadowing effect based on the orientation of the electronic device;
        render the image such that the shadowing effect is applied to the first portion and the shadow region when the shadowing application mode is a landscape mode; and
        render the image such that the shadowing effect is displayed on a region adjacent to the second axis in the first portion and a region adjacent to the second axis in the second portion when the shadowing application mode is a portrait mode.

2. The electronic device of claim 1, further comprising:
    wherein the context information comprises the orientation of the electronic device, and wherein the processor is further configured to:
determine the position of the virtual light source based on the orientation of the electronic device.

3. The electronic device of claim 2, wherein the time information indicates a time of the position of the virtual light source with respect to the orientation of the electronic device.

4. The electronic device of claim 1, further comprising:
a plurality of illumination sensors configured to sense the illumination around the electronic device,
wherein the processor is further configured to:
determine the position of the virtual light source based on a value detected by an illumination sensor among the plurality of illumination sensors meeting the specified condition.

5. The electronic device of claim 4, wherein the processor is further configured to:
determine positions of a plurality of virtual light sources based on values detected by the plurality of illumination sensors meeting the specified condition;
determine a plurality of image effects respectively corresponding to the plurality of virtual light sources; and
render the image by applying the plurality of image effects.

6. The electronic device of claim 1, wherein the processor is further configured to:
render the image such that a number of visual objects included in the image or luminance output in at least a portion of the image is changed according to a change in the display state.

7. The electronic device of claim 1, wherein the image includes a visual object and a shadow object corresponding to the visual object, and
wherein the processor is further configured to:
render the image such that the shadow object is displayed in a length determined according to the display state.

8. The electronic device of claim 1, wherein the processor is further configured to:
divide a basic image to be displayed on the foldable display into a background region and a region of interest;
apply a first image effect to the background region based on the display state; and
apply a second image effect to the region of interest based on at least one of the display state or the position of the virtual light source.

9. The electronic device of claim 8, wherein the first image effect comprises changing luminance of the background region based on the display state.

10. The electronic device of claim 8, wherein the second image effect comprises displaying a shadow object on the region of interest or a periphery of the region of interest depending on at least one of the display state or the position of the virtual light source.

11. A method for outputting an image in an electronic device, the method comprising:
identifying whether a specified condition for determining a position of a virtual light source is satisfied, wherein the specified condition includes at least one of a change of a display state, a predetermined period elapsing, or movement of the electronic device out of a specified range;
in response to satisfaction of the specified condition, obtaining context information associated with the electronic device, wherein the context information includes at least one of an orientation of the electronic device, time information, or illumination around the electronic device;
determining the position of the virtual light source with respect to a foldable display based on the context information;
detecting a display state of at least one of a housing of the electronic device or the foldable display;
rendering an image based on the detected display state and the position of the virtual light source; and
controlling the foldable display to display the rendered image,
wherein the housing comprises a first housing structure and a second housing structure foldable with respect to the first housing structure about a first axis,
wherein the foldable display includes a first portion coupled to the first housing structure and a second portion coupled to the second housing structure, and the first portion is foldable with respect to the second portion about a second axis, and
wherein the method further comprises:
determining a shadow region on which a shadowing effect is to be applied in the second portion based on the display state and the position of the virtual light source; and
determining a shadowing application mode associated with the shadowing effect based on the orientation of the electronic device, and
wherein the rendering of the image comprises:
rendering the image such that the shadowing effect is applied to the first portion and the shadow region when the shadowing application mode is a landscape mode; and
rendering the image such that the shadowing effect is displayed on a region adjacent to the second axis in the first portion and a region adjacent to the second axis in the second portion when the shadowing application mode is a portrait mode.

12. The method of claim 11, wherein the obtaining the context information comprises:
obtaining the orientation of the electronic device, and
wherein the determining the position of the virtual light source comprises:
determining the position of the virtual light source based on the orientation of the electronic device.

13. The method of claim 11, wherein the obtaining the context information comprises:
obtaining at least one illumination value around the electronic device; and
determining the position of the virtual light source based on the at least one illumination value meeting the specified condition.

14. The method of claim 11, wherein the rendering the image comprises:
rendering the image such that a number of visual objects included in the image or luminance output in at least a portion of the image is changed according to a change in the display state.

15. The method of claim 11, wherein the image includes a visual object and a shadow object corresponding to the visual object, and
wherein the rendering the image further comprises:
rendering the image such that the shadow object is displayed in a length determined according to the display state.

16. The method of claim 11, further comprising:
obtaining a basic image; and dividing the basic image into a background region and a region of interest, wherein the rendering the image further comprises:

applying a first image effect to the background region based on the display state; and applying a second image effect to the region of interest based on the display state or the position of the virtual light source.

17. The method of claim 16, wherein the first image effect comprises changing luminance of the background region based on the display state, and wherein the second image effect comprises displaying a shadow object on the region of interest or a periphery of the region of interest depending on at least one of the display state or the position of the virtual light source.

* * * * *